(12) United States Patent
Numao et al.

(10) Patent No.: US 10,418,649 B2
(45) Date of Patent: Sep. 17, 2019

(54) FUEL CELL STACK AND SEAL PLATE USED FOR THE SAME

(71) Applicant: Nissan Motor Co., Ltd., Kanagawa (JP)

(72) Inventors: Yasuhiro Numao, Kanagawa (JP); Kazuhiro Kageyama, Kanagawa (JP)

(73) Assignee: Nissan Motor Co., Ltd., Kanagawa (JP)

( * ) Notice: Subject to any disclaimer, the term of this patent is extended or adjusted under 35 U.S.C. 154(b) by 192 days.

(21) Appl. No.: 14/384,099

(22) PCT Filed: Mar. 7, 2013

(86) PCT No.: PCT/JP2013/001444
§ 371 (c)(1),
(2) Date: Sep. 9, 2014

(87) PCT Pub. No.: WO2013/132860
PCT Pub. Date: Sep. 12, 2013

(65) Prior Publication Data
US 2015/0050577 A1    Feb. 19, 2015

(30) Foreign Application Priority Data

Mar. 9, 2012   (JP) .................................. 2012-053310
Dec. 18, 2012  (JP) .................................. 2012-275479

(51) Int. Cl.
*H01M 8/24*    (2016.01)
*H01M 8/0271*  (2016.01)
(Continued)

(52) U.S. Cl.
CPC ....... *H01M 8/0271* (2013.01); *H01M 8/0276* (2013.01); *H01M 8/0297* (2013.01);
(Continued)

(58) Field of Classification Search
CPC .... H01M 2/14; H01M 8/0271; H01M 8/0273; H01M 8/0276; H01M 8/0278;
(Continued)

(56) References Cited

U.S. PATENT DOCUMENTS 6,596,427 B1 * 7/2003 Wozniczka ......... H01M 8/0247
                                                29/623.2
7,201,990 B2 * 4/2007 Wariishi ............. H01M 8/0258
                                                429/415
(Continued)

FOREIGN PATENT DOCUMENTS

CA     2 331 740 A1   11/1999
DE   198 21 767 A1    11/1999
(Continued)

OTHER PUBLICATIONS

International Search Report for corresponding International Application No. PCT/JP2013/001444, dated Jul. 22, 2013 (2 pages).
(Continued)

*Primary Examiner* — Amanda J Barrow
(74) *Attorney, Agent, or Firm* — Osha Liang LLP

(57) ABSTRACT

A fuel cell stack includes a plurality of cell modules each formed by stacking a plurality of fuel cells, each of the plurality of fuel cells having a membrane electrode assembly having an insulating member at an outer periphery portion thereof and paired separators sandwiching the membrane electrode assembly, and by attaching the insulating members of adjacent fuel cells together, and a seal plate interposed between the stacked cell modules. The seal plate includes a plurality of manifold holes from which two power-generation gases flow separately through the plurality of fuel cells, and a first seal member provided along a peripheral portion
(Continued)

of each of the plurality of manifold holes to seal a corresponding one of the two power-generation gases flowing through the manifold hole.

9 Claims, 21 Drawing Sheets

(51) Int. Cl.
| | |
|---|---|
| H01M 8/2483 | (2016.01) |
| H01M 8/2485 | (2016.01) |
| H01M 8/0276 | (2016.01) |
| H01M 8/0297 | (2016.01) |
| H01M 8/241 | (2016.01) |
| H01M 8/249 | (2016.01) |
| H01M 8/1018 | (2016.01) |

(52) U.S. Cl.
CPC ......... *H01M 8/249* (2013.01); *H01M 8/2415* (2013.01); *H01M 8/2483* (2016.02); *H01M 8/2485* (2013.01); H01M 2008/1095 (2013.01); H01M 2250/10 (2013.01); Y02B 90/14 (2013.01)

(58) Field of Classification Search
CPC .... H01M 8/028; H01M 8/0284; H01M 8/249; H01M 8/0297; H01M 8/242
See application file for complete search history.

(56) References Cited

U.S. PATENT DOCUMENTS

| | | | |
|---|---|---|---|
| 7,674,550 B2 | 3/2010 | Wakahoi et al. | |
| 8,551,671 B2 | 10/2013 | Ishikawa et al. | |
| 2002/0031697 A1* | 3/2002 | Sugita | H01M 8/0271 429/434 |
| 2002/0102453 A1* | 8/2002 | Suenaga | H01M 8/0273 429/465 |
| 2003/0054224 A1* | 3/2003 | Wariishi | H01M 8/0258 429/415 |
| 2003/0203260 A1* | 10/2003 | Lee | H01M 8/04029 429/434 |
| 2004/0115513 A1* | 6/2004 | Yang | H01M 8/0258 429/457 |
| 2004/0161649 A1* | 8/2004 | Wariishi | H01M 8/04119 429/413 |
| 2004/0224212 A1 | 11/2004 | Wakahoi et al. | |
| 2005/0031933 A1* | 2/2005 | Blunk | H01M 8/0206 429/437 |
| 2005/0271926 A1 | 12/2005 | Sugita et al. | |
| 2006/0090330 A1* | 5/2006 | Kauranen | H01M 8/0213 29/623.4 |
| 2007/0042250 A1* | 2/2007 | Inagaki | H01M 8/248 429/467 |
| 2009/0004539 A1 | 1/2009 | Ishikawa et al. | |
| 2009/0042086 A1 | 2/2009 | Ishikawa et al. | |
| 2009/0075134 A1* | 3/2009 | Tanaka | H01M 8/0206 429/434 |
| 2010/0092837 A1* | 4/2010 | Akbay | H01M 8/0247 429/492 |
| 2010/0196784 A1* | 8/2010 | Kimura | H01M 8/0206 429/483 |
| 2011/0229791 A1* | 9/2011 | Kageyama | H01M 8/2483 429/469 |
| 2011/0305965 A1* | 12/2011 | Lee | H01M 8/0258 429/455 |
| 2011/0305976 A1* | 12/2011 | Tanahashi | H01M 8/0273 429/535 |
| 2011/0318665 A1* | 12/2011 | Yamamoto | H01M 8/0273 429/469 |
| 2012/0181261 A1* | 7/2012 | Bruck | F01N 3/2066 219/205 |
| 2015/0064590 A1* | 3/2015 | Numao | H01M 8/026 429/432 |

FOREIGN PATENT DOCUMENTS

| | | | | |
|---|---|---|---|---|
| JP | 2004-335306 A | | 11/2004 | |
| JP | 2005-190706 A | | 7/2005 | |
| JP | 2009-009838 A | | 1/2009 | |
| JP | 2010-146781 A | | 7/2010 | |
| JP | 2012-023042 A | | 2/2012 | |
| WO | WO 2010/058258 | * | 5/2010 | ............. H01M 8/02 |
| WO | WO 2010/0161711 | * | 6/2010 | ............. H01M 8/02 |

OTHER PUBLICATIONS

Written Opinion for corresponding International Application No. PCT/JP2013/001444, dated Jul. 22, 2013 (6 pages).

International Preliminary Report on Patentability for corresponding International Application No. PCT/JP2013/001444, dated Jun. 30, 2014 (12 pages).

* cited by examiner

[Fig. 1]
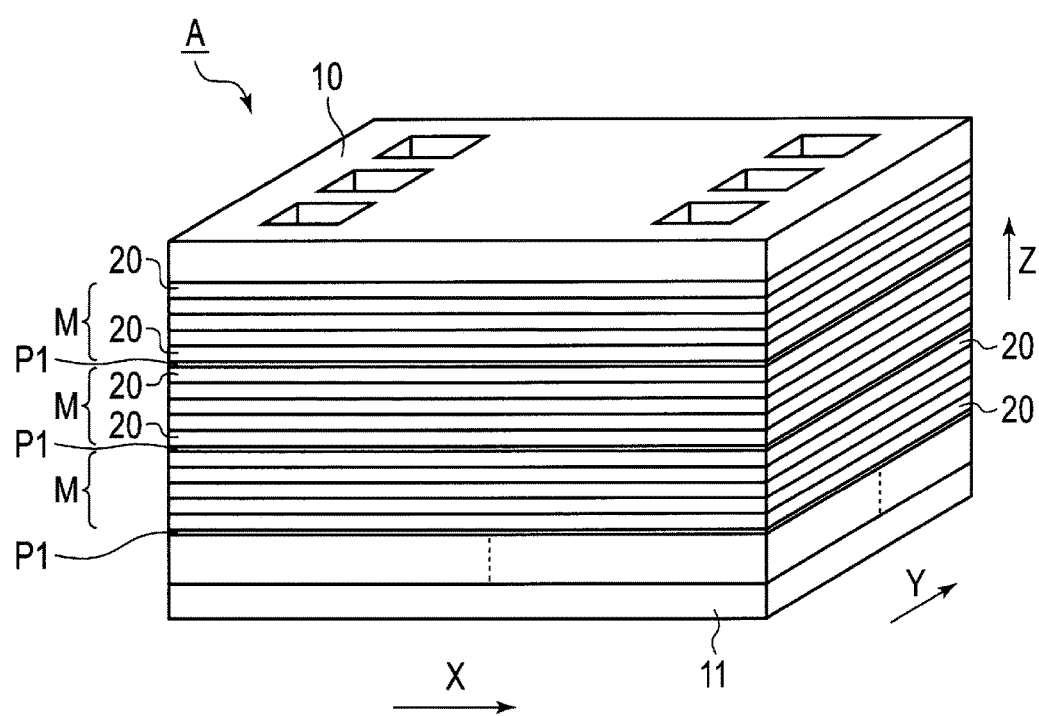

[Fig. 2]
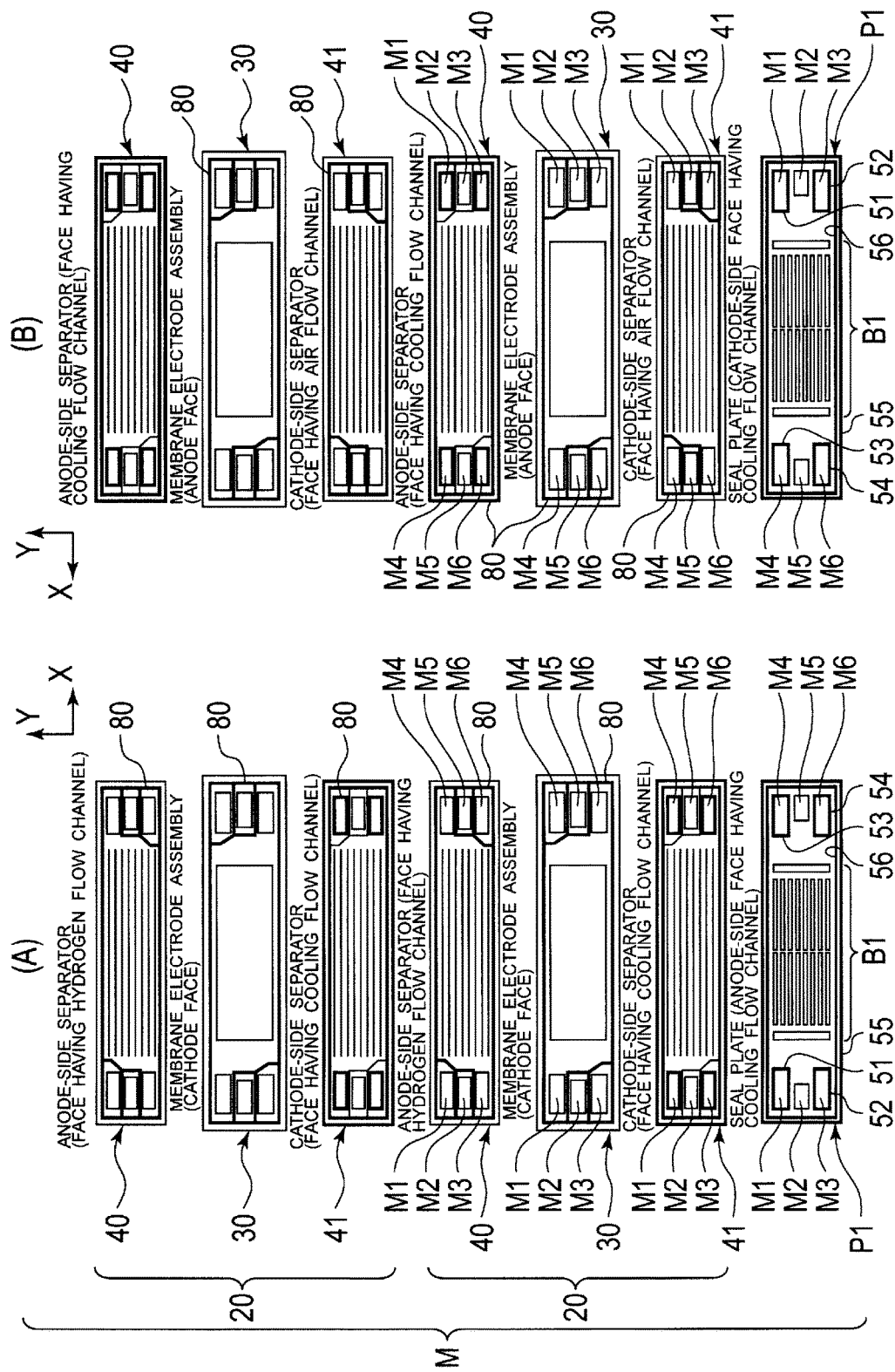

[Fig. 3]
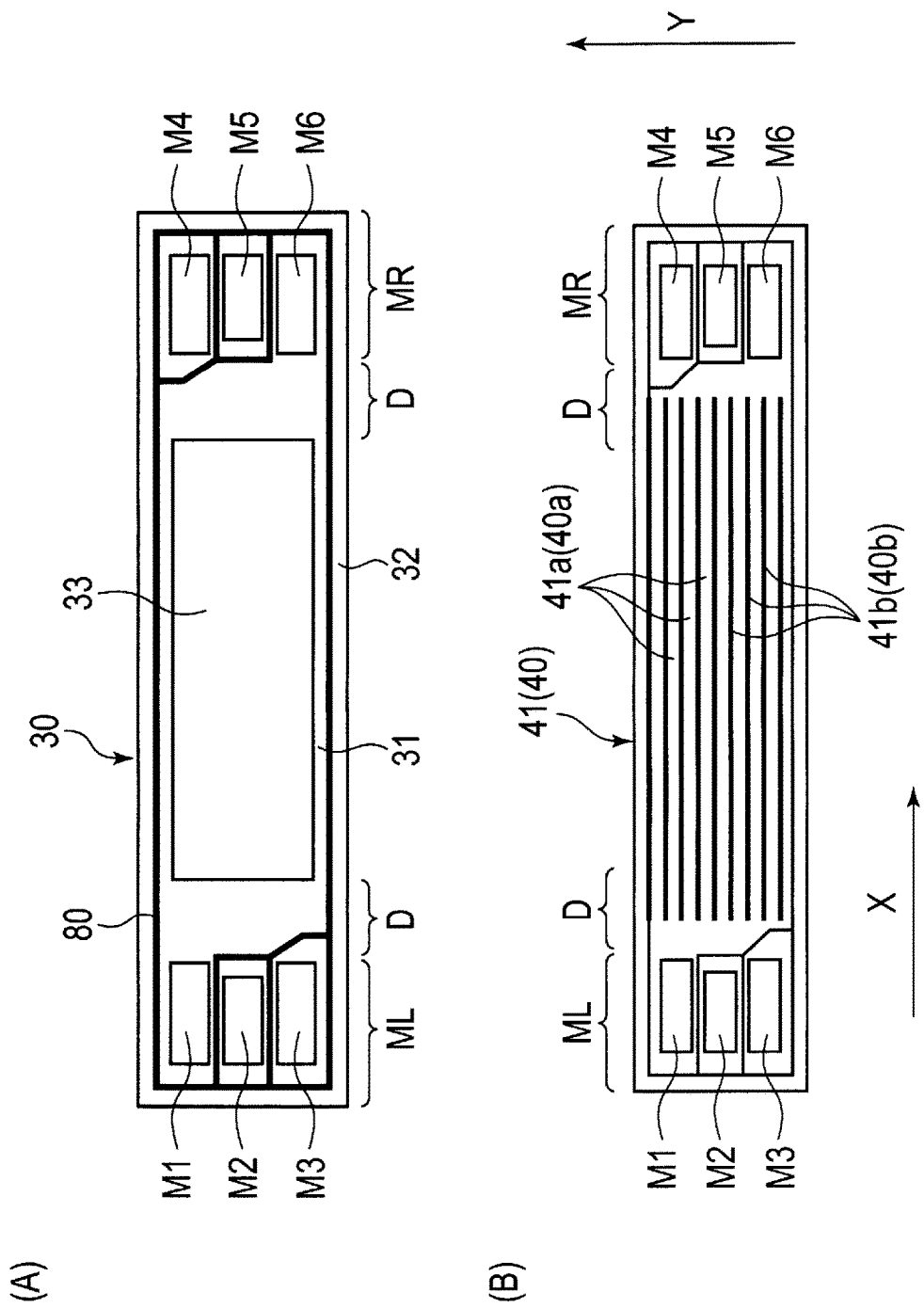

[Fig. 4]
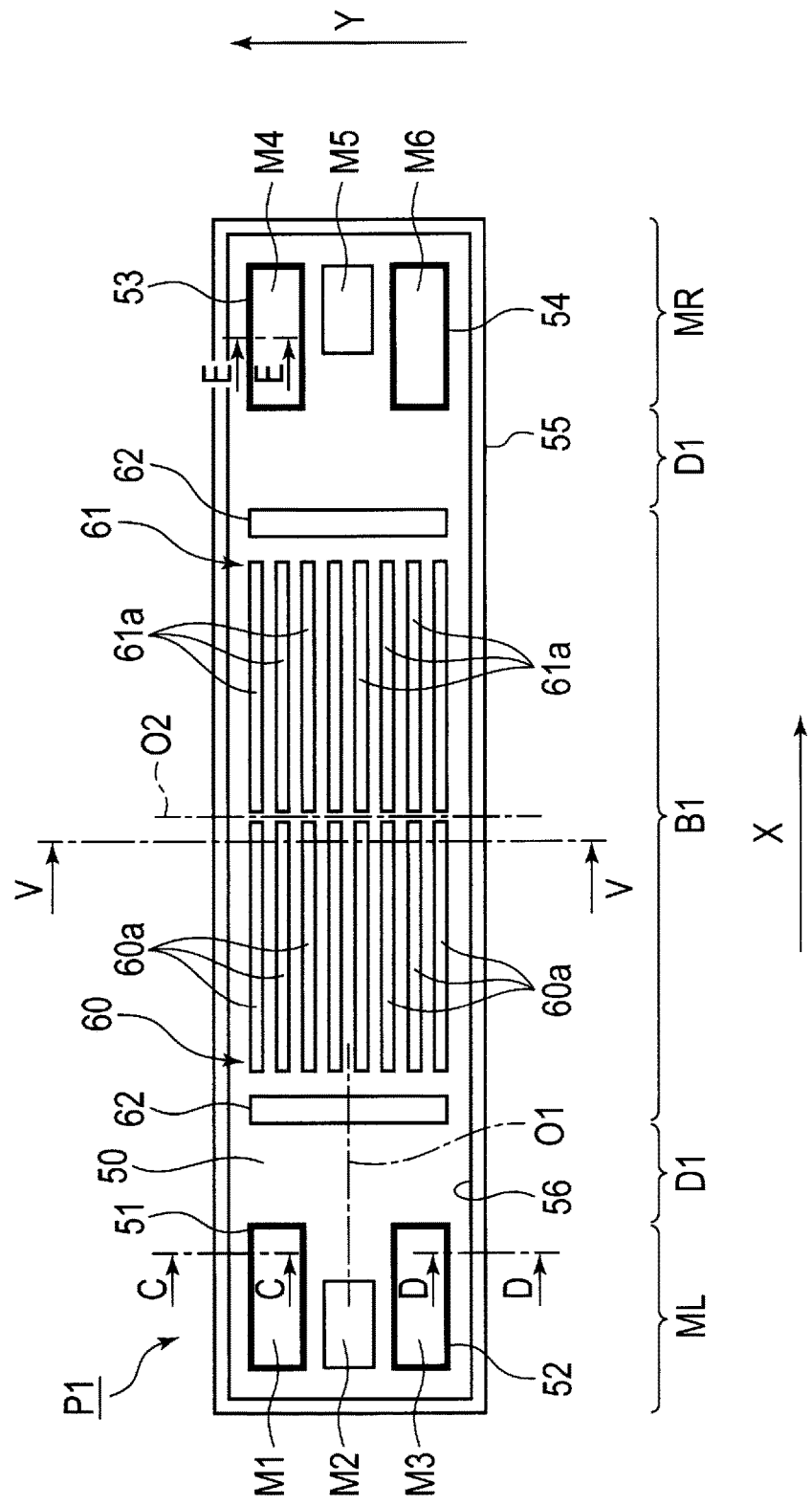

[Fig. 5]
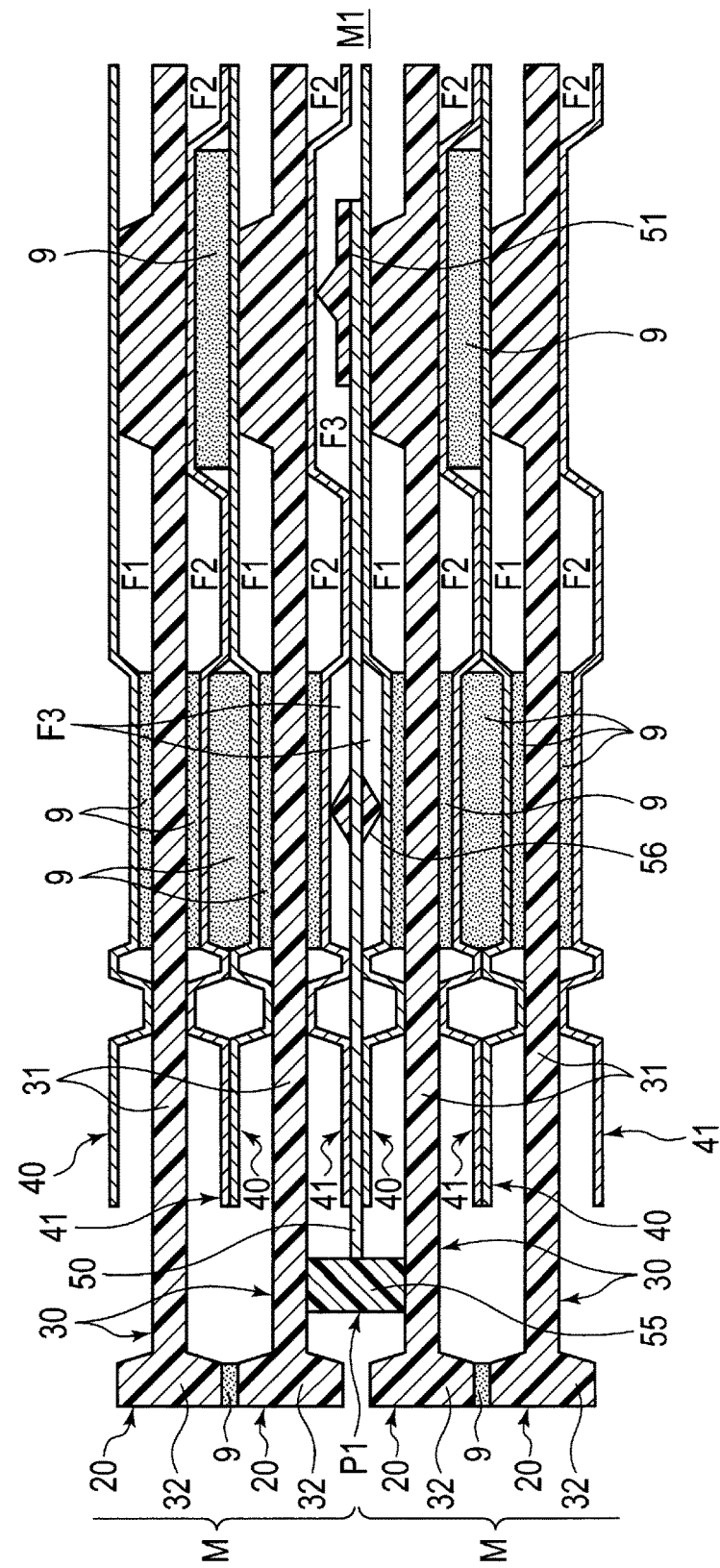

[Fig. 6]
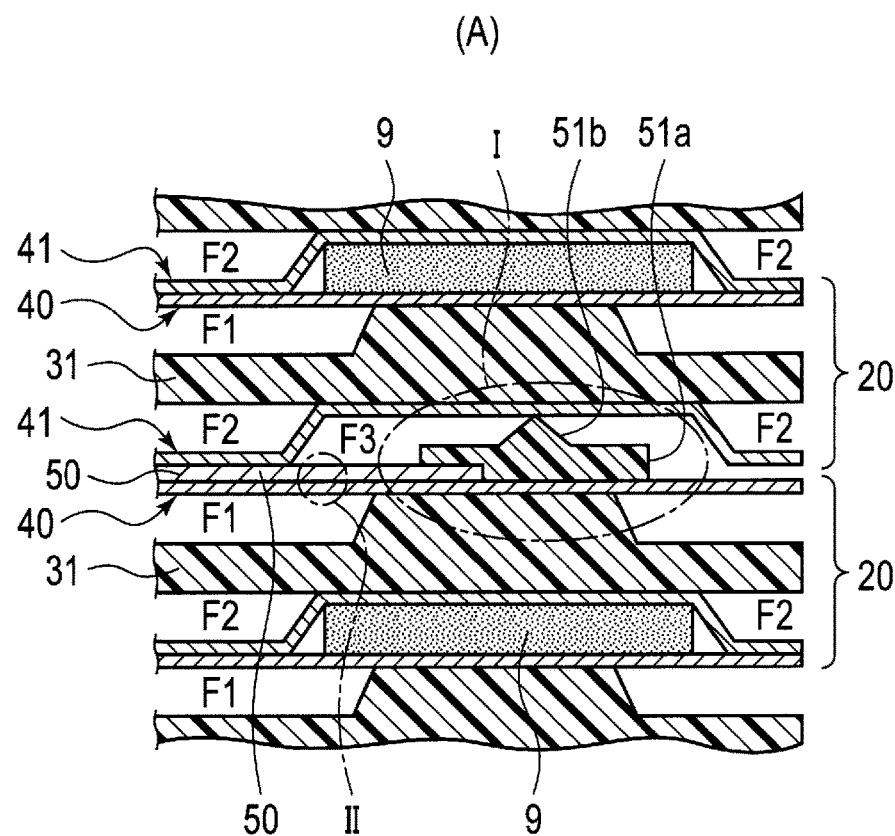
(A)
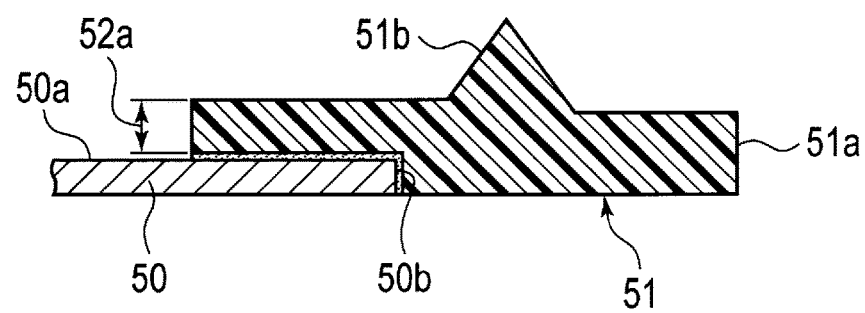
(B)

[Fig. 7]
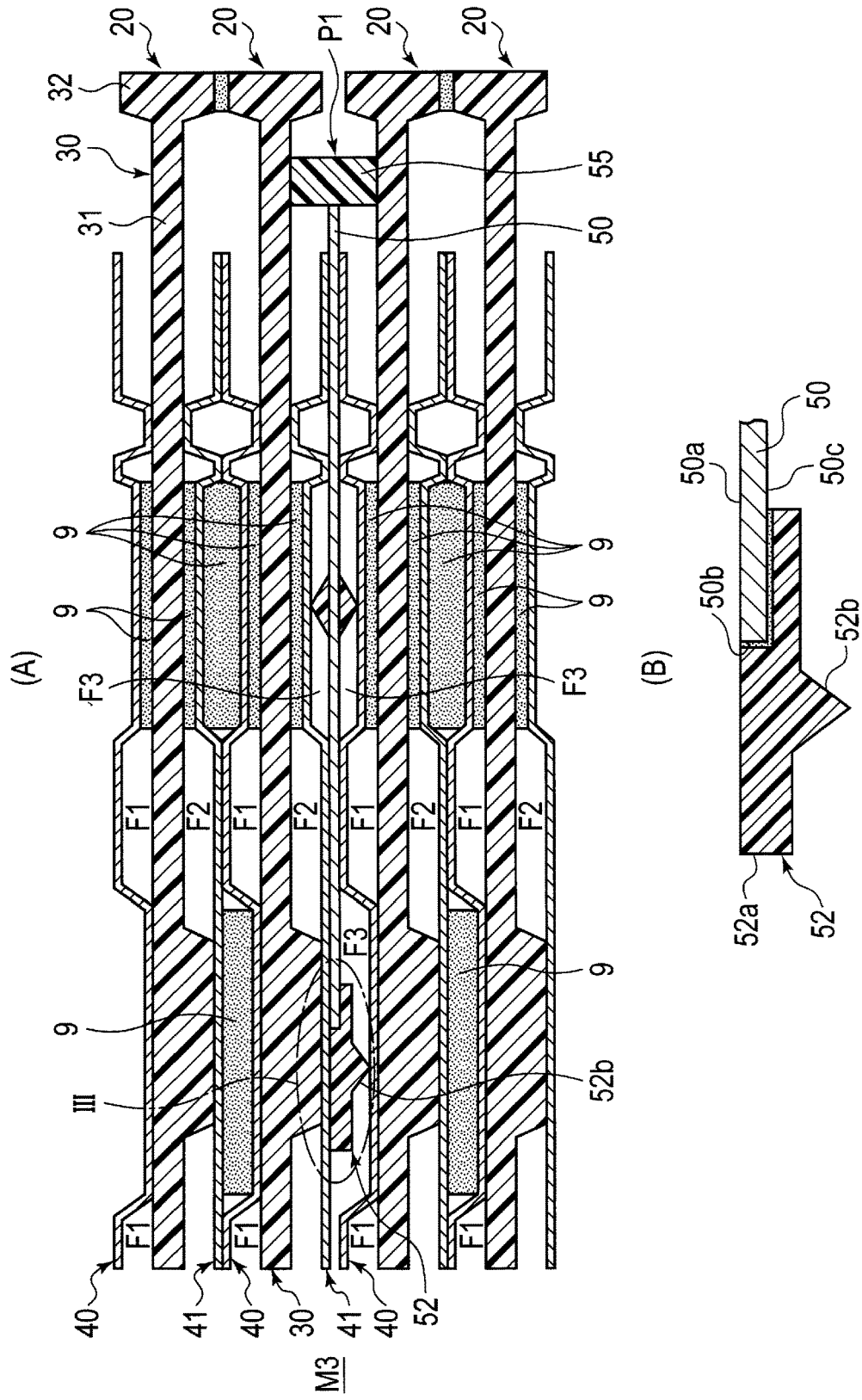

[Fig. 8]
(A)
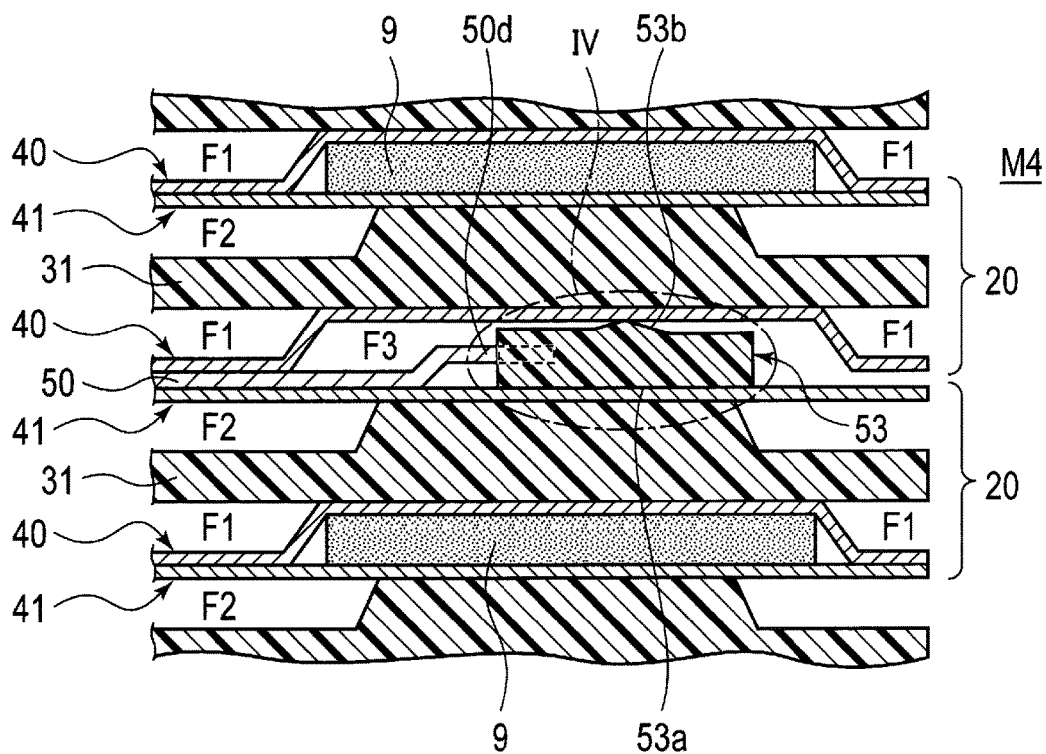
(B)
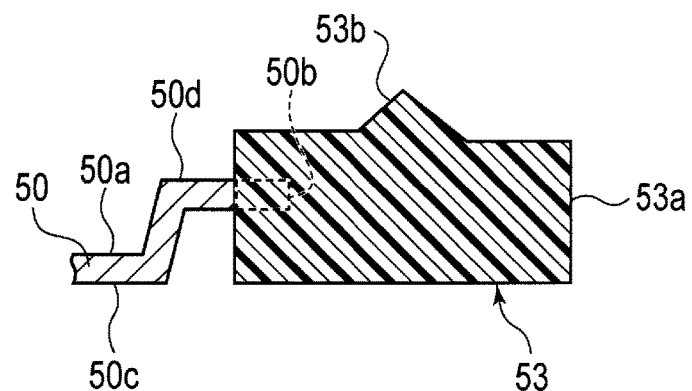

[Fig. 9]
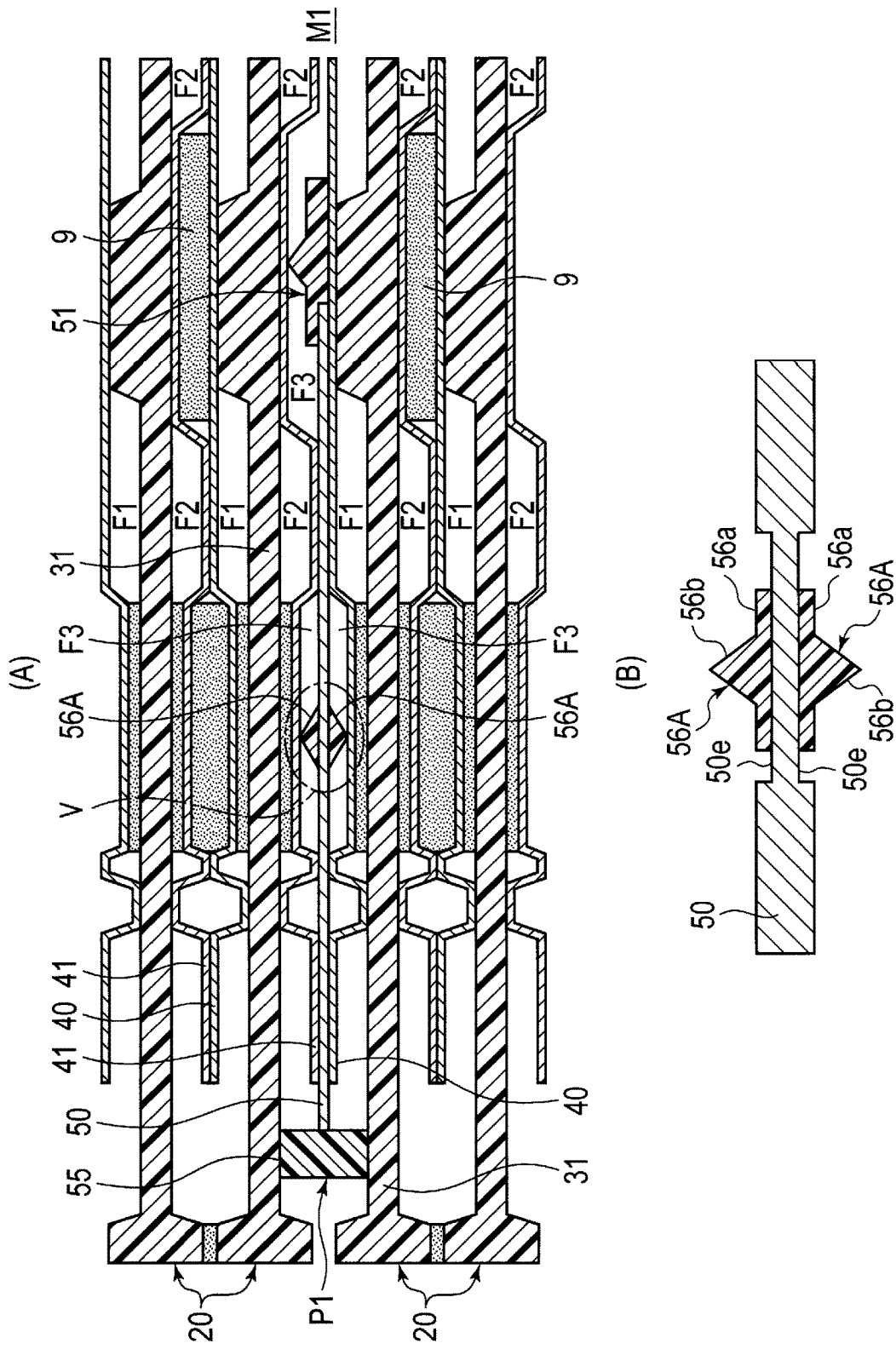

[Fig. 10]
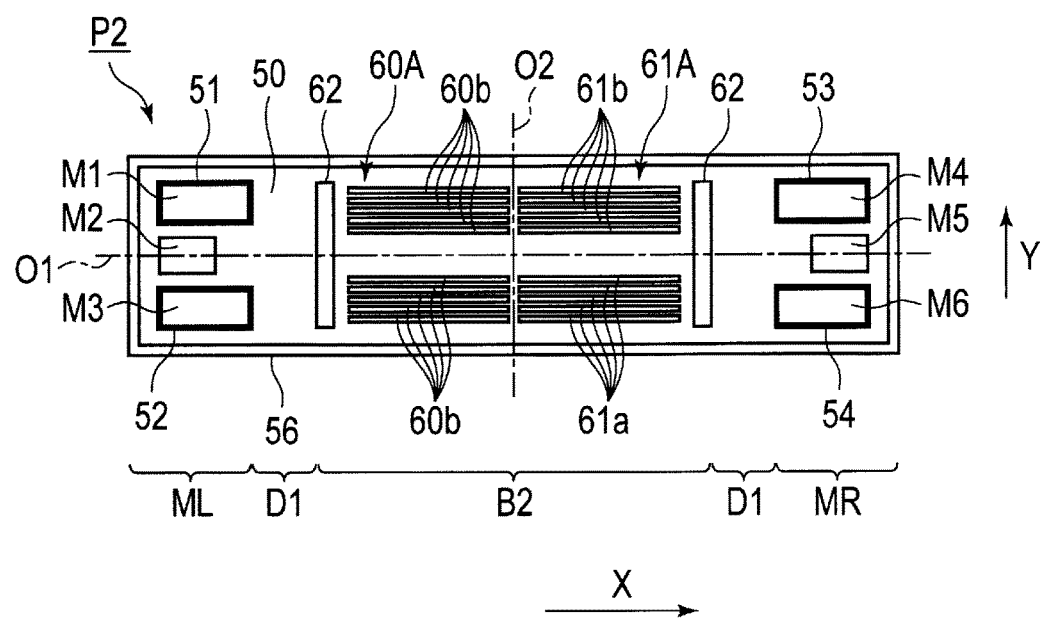
[Fig. 11]
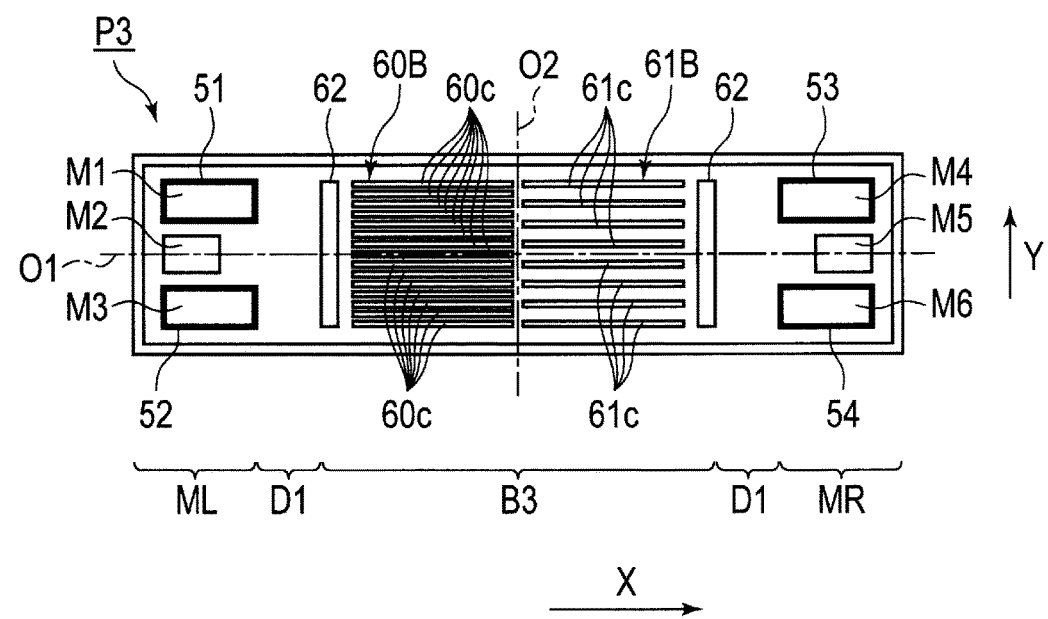

[Fig. 12]
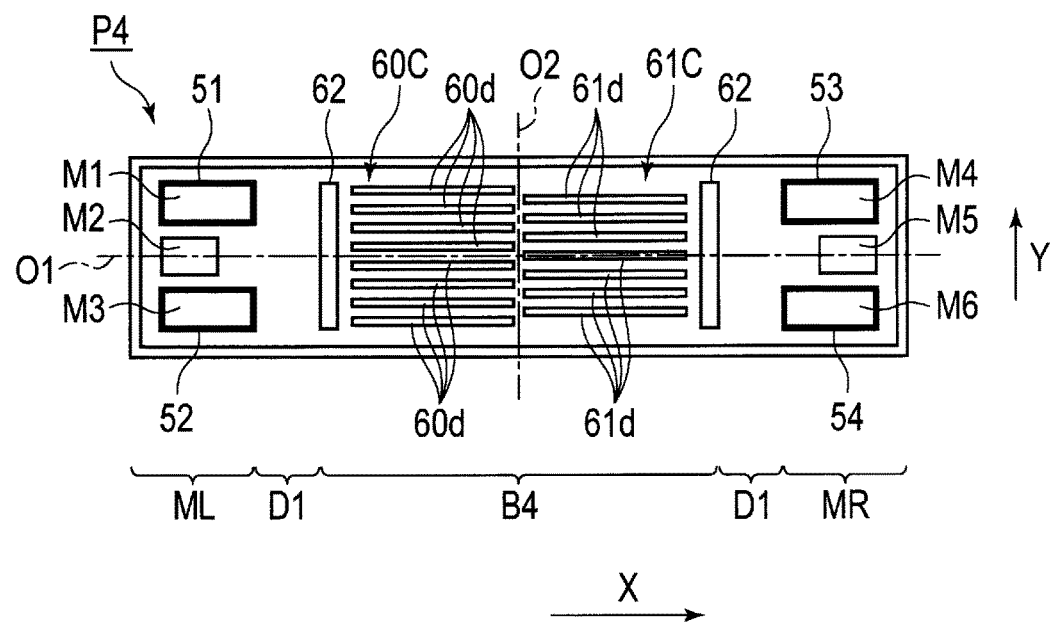
[Fig. 13]
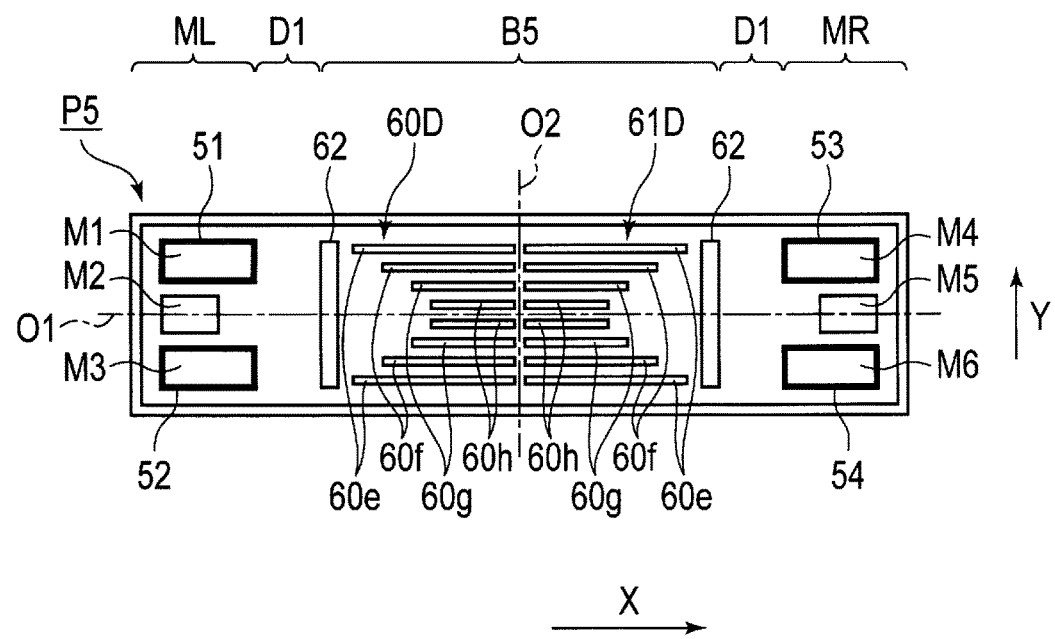

[Fig. 14]
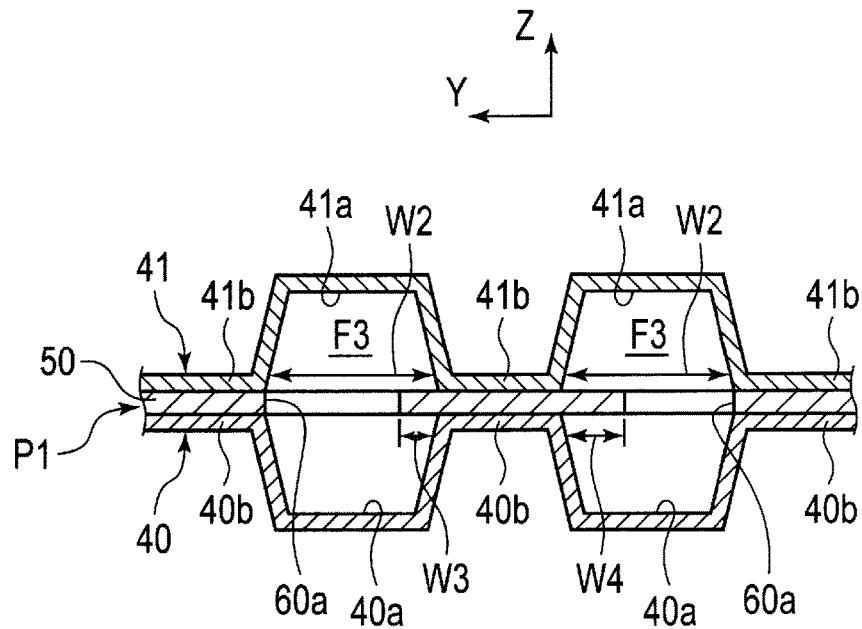
[Fig. 15]
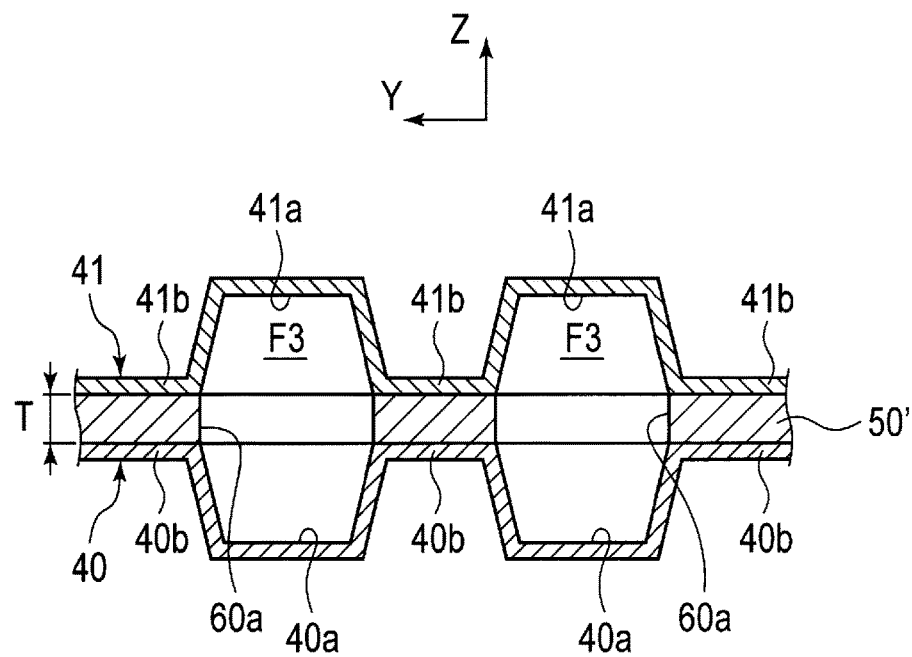

[Fig. 16]
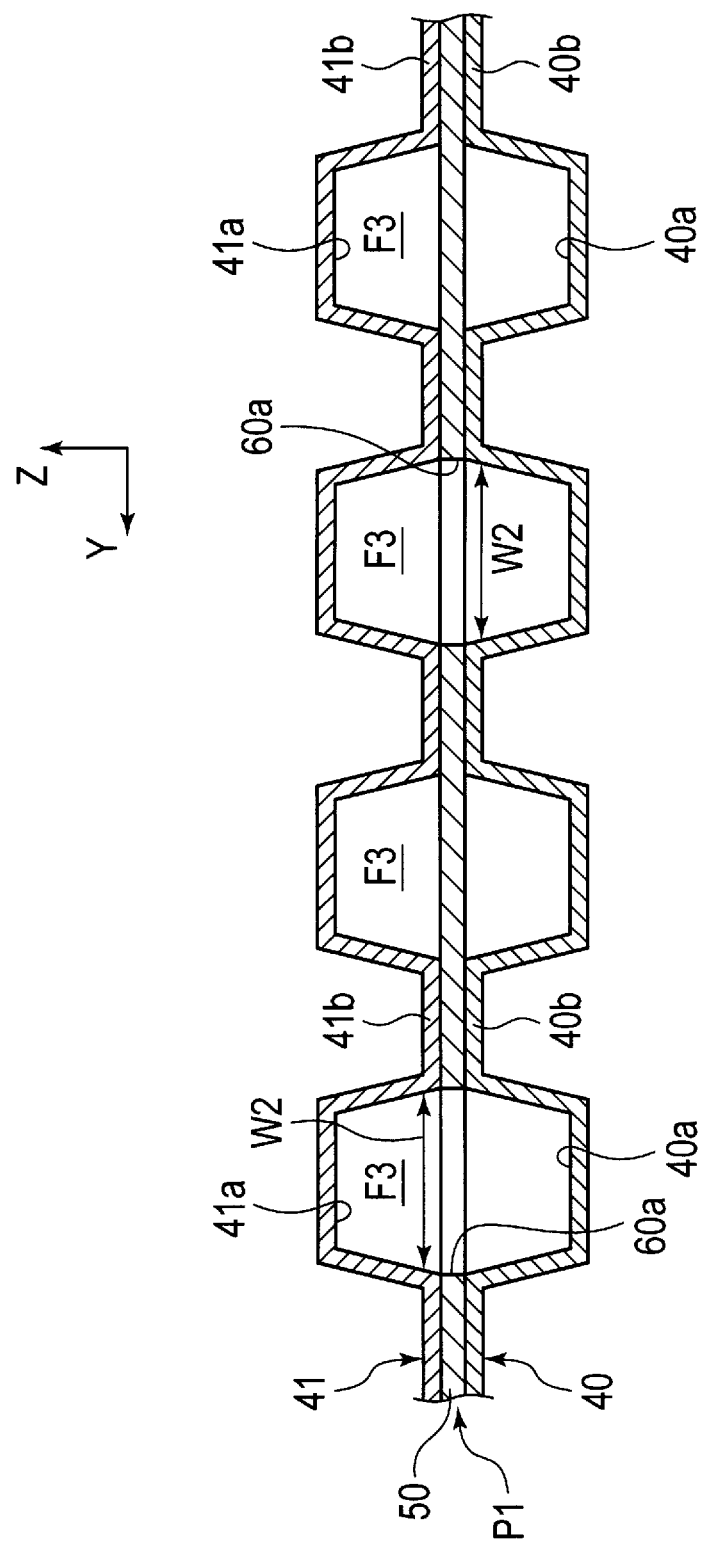

[Fig. 17]
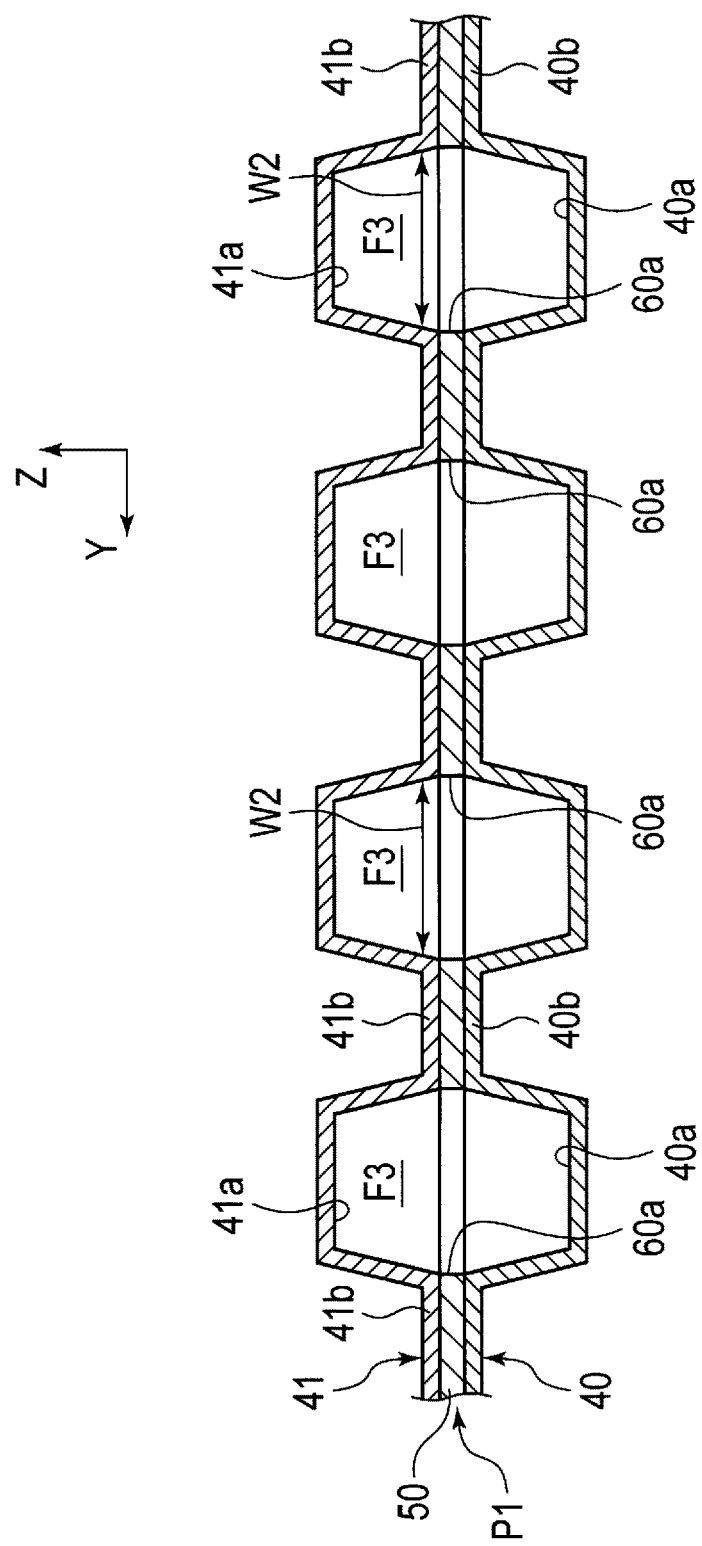

[Fig. 18]
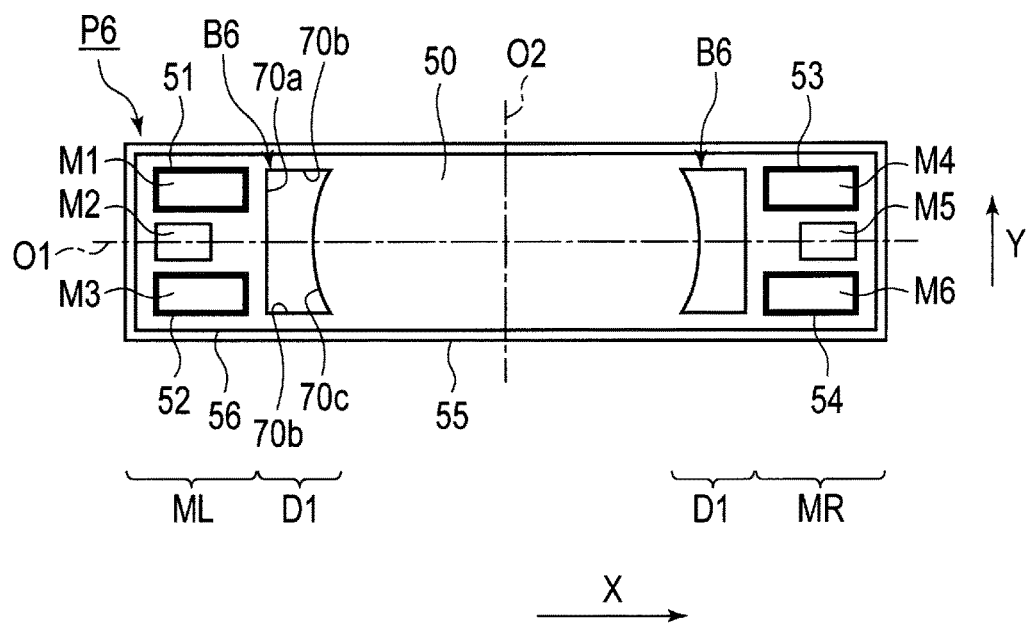
[Fig. 19]
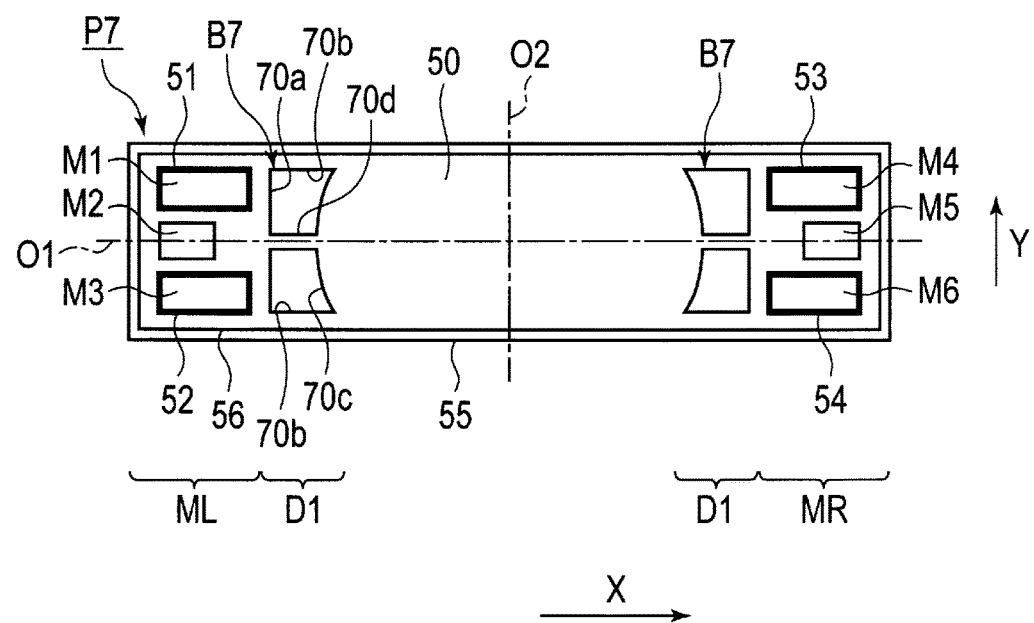

[Fig. 20]
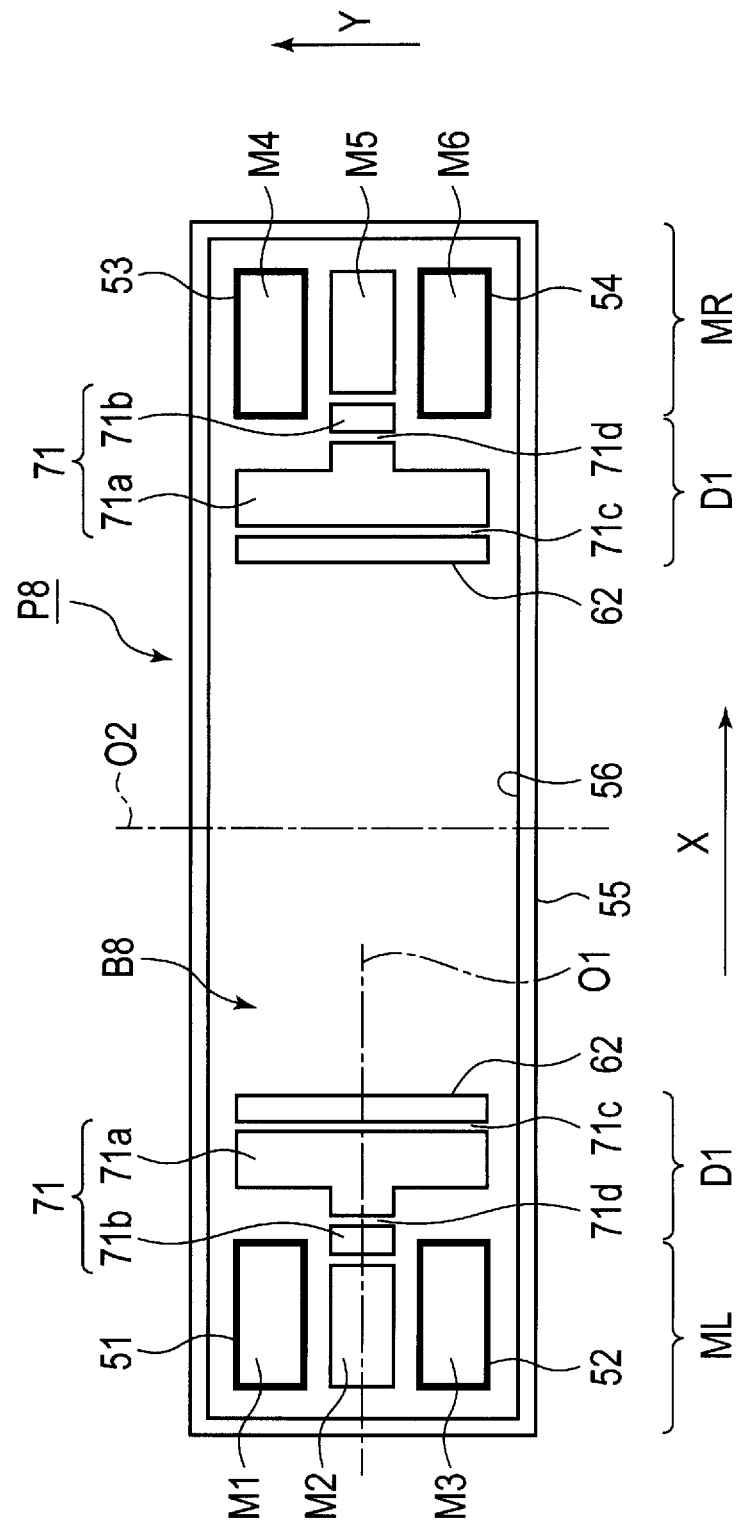

[Fig. 21]
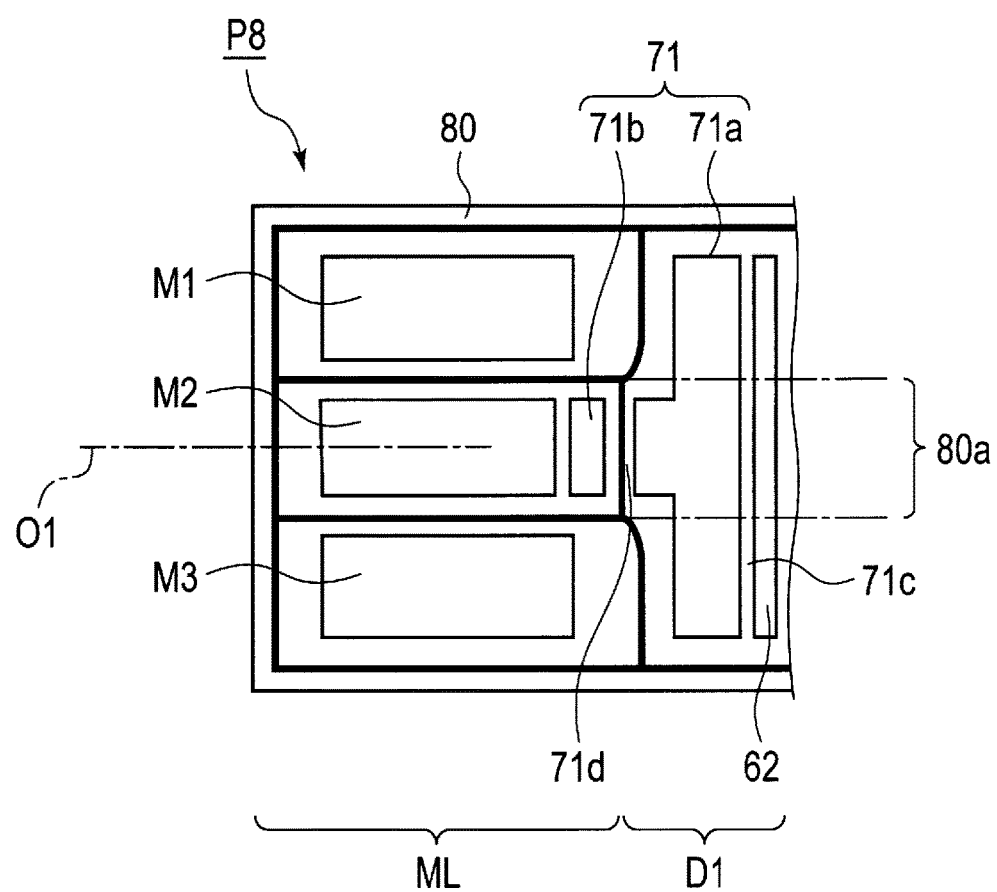

[Fig. 22]
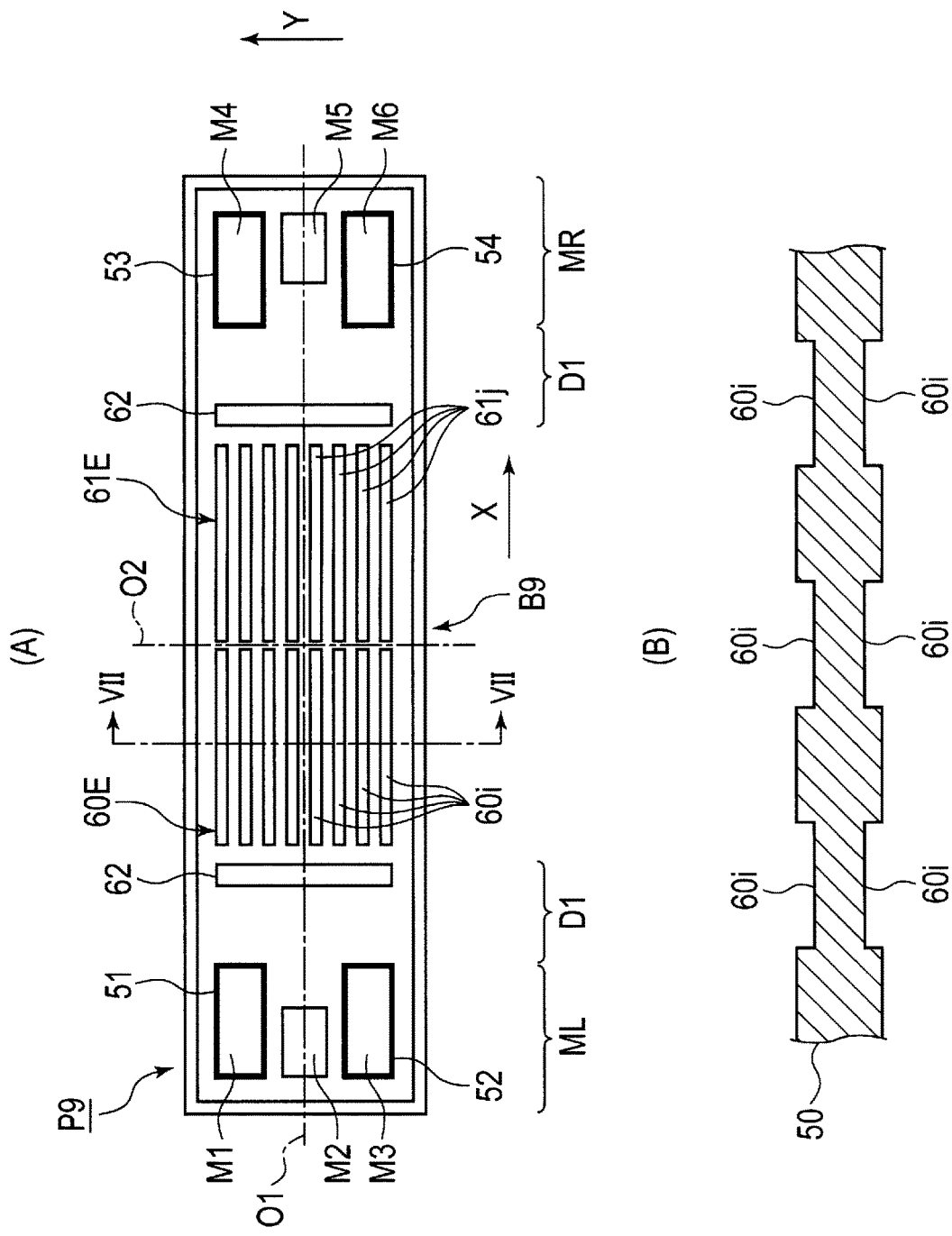

[Fig. 23]
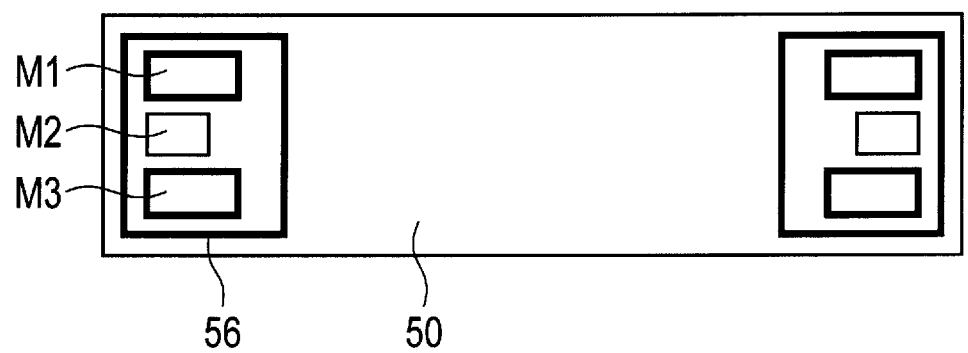

[Fig. 24]
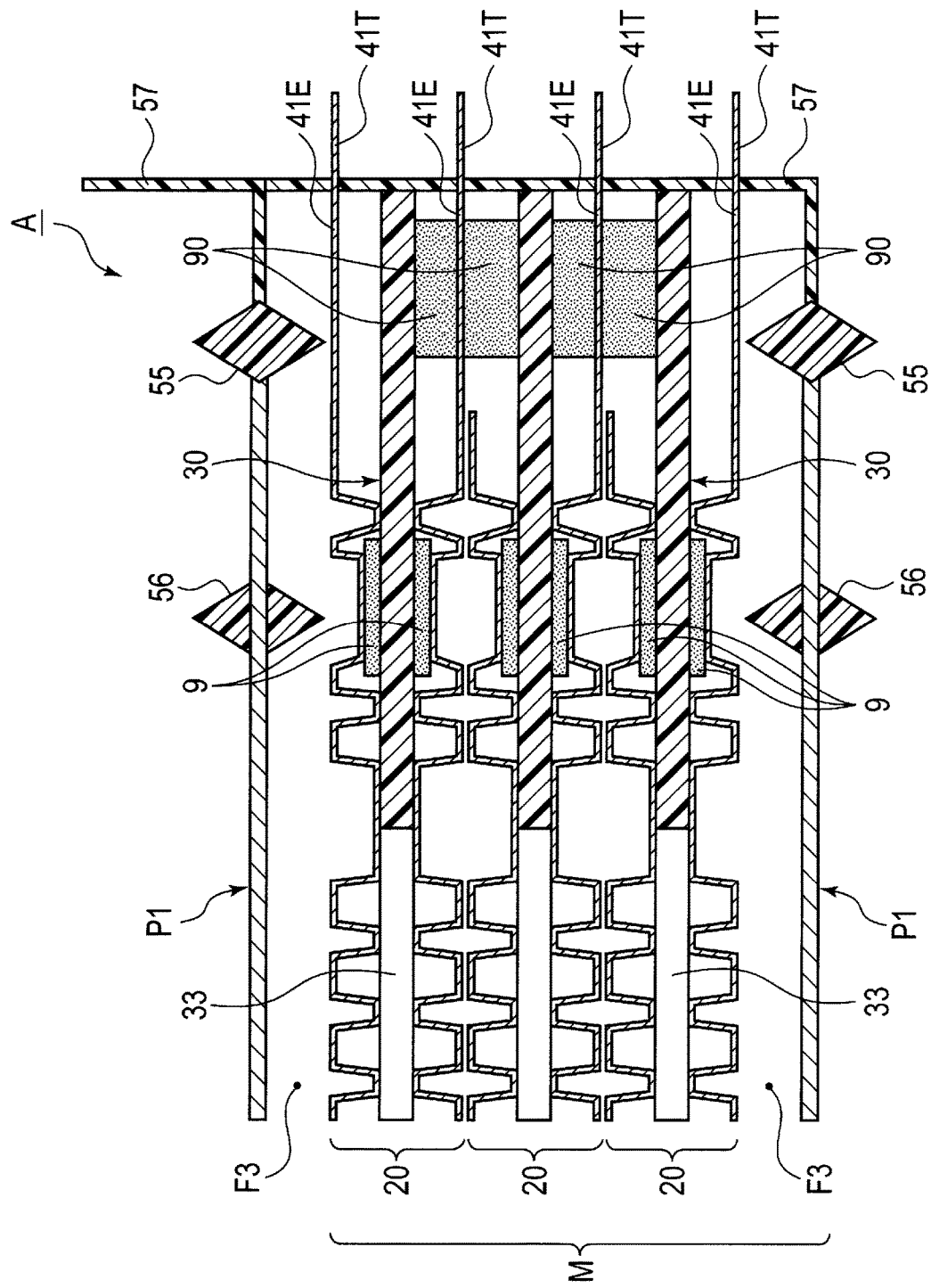

[Fig. 25]
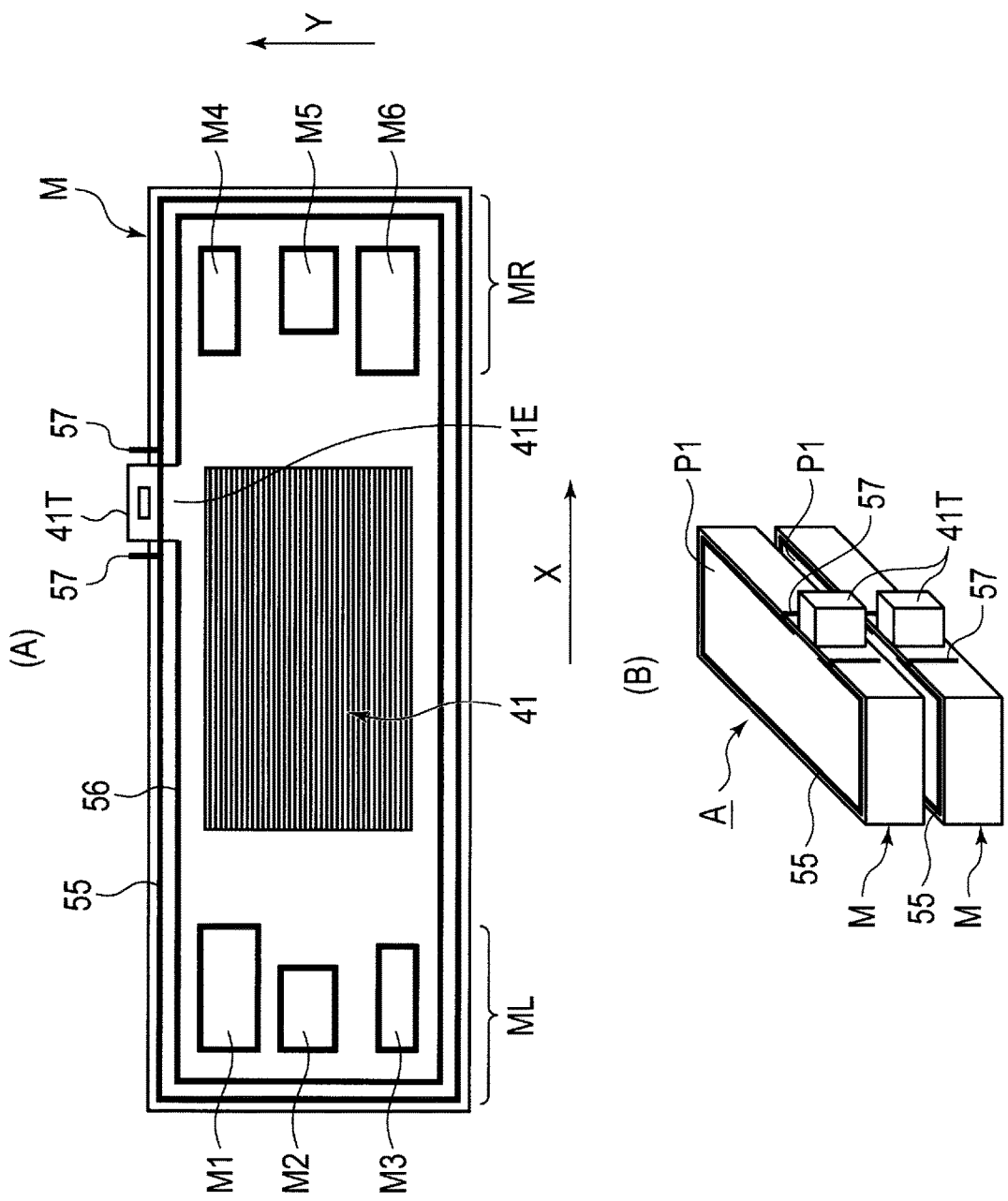

FUEL CELL STACK AND SEAL PLATE USED FOR THE SAME

CROSS-REFERENCE TO RELATED APPLICATIONS

This application is a National Stage application of International Patent Application No. PCT/JP2013/001444, filed on Mar. 7, 2013, which claims priority to Japanese Patent Application No. 2012-053310, filed on Mar. 9, 2012, and Japanese Patent Application No. 2012-275479, filed Dec. 18, 2012. Japanese Patent Application Nos. 2012-053310 and 2012-275479 as well as International Patent Application No. PCT/JP2013/001444 are hereby incorporated by reference in their entirety.

TECHNICAL FIELD

The present invention relates to a fuel cell stack formed by stacking multiple fuel cells and to a seal plate used in this fuel cell stack.

BACKGROUND ART

An art related to the fuel cell stack according to the present invention is disclosed in "FUEL CELL STACK STRUCTURE" of PTL 1.

In the fuel cell stack structure of PTL 1, multiple cell modules each formed by stacking multiple fuel cells are arranged in a row in a cell-stacking direction, and a space between adjacent ones of the cell modules is sealed with a bead gasket.

Further, the separator of each end cell of a cell module to be in contact with the bead gasket is given larger surface rigidity than the separators of center cells of the cell module. Specifically, in order for the separator of the end cell to have the larger surface rigidity than those of the center cells, a flat panel is superimposed on the separator of the end cell.

CITATION LIST

Patent Literature

[PTL 1]
Japanese Patent Application Laid-Open Publication No. 2005-190706

SUMMARY OF INVENTION

In the related art described above, the flat panel including the bead gasket is joined to the separator of the end cell with an adhesive. Accordingly, when the bead gasket is deteriorated, the cell module, whose fuel cells are still able to generate power, has to be discarded. This is inefficient.

Accordingly, the present invention has an objective of providing a fuel cell stack and a seal plate used in the fuel cell stack, which allows continued use of a cell module formed by stacking multiple fuel cells.

To achieve the objective above, a fuel cell stack according to a first aspect of the preset invention includes: cell modules each formed by stacking multiple fuel cells each including a membrane electrode assembly having an insulating member at an outer periphery portion thereof and paired separators sandwiching the membrane electrode assembly, and by attaching the insulating members of adjacent ones of the fuel cells together; and a seal plate interposed between the stacked cell modules. The seal plate includes: multiple manifold holes from which two kinds of power-generation gases flow in and out separately to flow through the fuel cells; and a first seal member provided along a peripheral portion of each of the manifold holes to seal a corresponding one of the power-generation gases flowing through the manifold hole.

A seal plate according to a second aspect of the present invention is a seal plate configured to be interposed between adjacent ones of at least two cell modules each formed by stacking multiple fuel cells into an integrated unit, and which includes: a plate substrate in which manifold holes are formed from which two kinds of power-generation gases flow in and out separately through the fuel cells; and a seal member provided along a peripheral portion of each of the manifold holes to seal a corresponding one of the power-generation gases flowing through the manifold hole. The seal member includes: a seal base provided on the peripheral portion of the manifold hole; and a seal lip protruding from a surface of the seal base. The seal lip is displaced toward a center of the manifold hole.

BRIEF DESCRIPTION OF DRAWINGS

FIG. 1 is a perspective external view schematically showing a fuel cell stack according to a first embodiment of the present invention.

FIG. 2(A) is plan views each showing one of the faces of a separator, a membrane electrode assembly, or a seal plate constituting a cell module to illustrate their arrangement, and FIG. 2(B) is plan views each showing the other face of the separator shown in FIG. 2(A).

FIG. 3(A) is an enlarged plan view of the membrane electrode assembly shown in FIG. 2(A), and FIG. 3(B) is an enlarged plan view of the cathode-side separator shown in FIG. 2(A).

FIG. 4 is an enlarged plan view of the seal plate shown in FIGS. 2(A) and 2(B).

FIG. 5 is an enlarged sectional view, taken along line C-C in FIG. 4, of a part of the fuel cell stack in FIG. 1.

FIG. 6(A) is an enlarged view showing in detail a part around a seal member provided on the boarder portion of a manifold hole for supplying a hydrogen-containing gas, and FIG. 6(B) is an enlarged view of a part indicated by encircling line I in FIG. 6(A).

FIG. 7(A) is a sectional view, taken along line D-D in FIG. 4, showing part of the fuel cell stack, and FIG. 7(B) is an enlarged view of a part indicated by encircling line III in FIG. 7(A).

FIG. 8(A) is an enlarged view showing in detail a part around a seal member, of another example, provided on a peripheral portion of a manifold hole, and FIG. 8(B) is an enlarged view of a part indicated by encircling line IV in FIG. 8(A).

FIG. 9(A) is an enlarged view, taken along line C-C in FIG. 4, showing in detail a part around an inner periphery seal member of another example, and FIG. 9(B) is an enlarged view of a part indicated by encircling line V in FIG. 9(A).

FIG. 10 is a plan view of a seal plate according to a second embodiment of the present invention.

FIG. 11 is a plan view of a seal plate according to a third embodiment of the present invention.

FIG. 12 is a plan view of a seal plate according to a fourth embodiment of the present invention.

FIG. 13 is a plan view of a seal plate according to a fifth embodiment of the present invention.

FIG. 14 is an enlarged sectional view, taken along line V-V in FIG. 4, showing a positional relation between the seal plate and the separators.

FIG. 15 is an enlarged view of a section taken at an equivalent position to line V-V in FIG. 4, and shows an example where a plate substrate is thicker than that in FIG. 14.

FIG. 16 is an enlarged view of a section taken at an equivalent position to line V-V in FIG. 4.

FIG. 17 is an enlarged view of a section taken at an equivalent position to line V-V in FIG. 4.

FIG. 18 is a plan view of a seal plate according to a sixth embodiment of the present invention.

FIG. 19 is a plan view of a seal plate according to a seventh embodiment of the present invention.

FIG. 20 is a plan view of a seal plate according to an eighth embodiment of the present invention.

FIG. 21 is an enlarged plan view of an end portion of the seal plate in FIG. 20.

FIG. 22(A) is a plan view of a seal plate according to a ninth embodiment of the present invention, and FIG. 22(B) is an enlarged view of a section taken along line VII-VII in FIG. 22(A).

FIG. 23 is a plan view of a seal plate according to another example of the present invention.

FIG. 24 is a sectional view of a part of a fuel cell stack according to a tenth embodiment of the present invention.

FIG. 25(A) is a plan view of the cell module in FIG. 24, and FIG. 25(B) is a perspective view of the fuel cell stack.

DESCRIPTION OF EMBODIMENTS

First Embodiment

With reference to the drawings, embodiments of the present invention are described below. FIG. 1 is a perspective external view schematically showing a fuel cell stack according to a first embodiment of the present invention. FIG. 2(A) is plan views each showing one of the faces of a separator, a membrane electrode assembly, or a seal plate constituting a cell module to illustrate their arrangement, and FIG. 2(B) shows plan views each showing the other face thereof. FIG. 3(A) is an enlarged plan view of the membrane electrode assembly, and FIG. 3(B) is an enlarged plan view of the cathode-side separator. FIG. 4 is an enlarged plan view of the seal plate. FIG. 5 is an enlarged sectional view, taken along line C-C in FIG. 4, of part of the fuel cell stack in FIG. 1.

A fuel cell stack A, according to one example, shown in FIG. 1 has multiple cell modules M stacked on one another. A seal plate P1 is interposed between adjacent ones of the cell modules M. These cell modules M are sandwiched and pressed by end plates 10 and 11 from both above and below in FIG. 1.

Each cell module M is formed by stacking a required number of fuel cells 20. The outside wall surfaces of the cell modules M are formed by flange portions 32 of cell frames 30 and an adhesive 9, which are to be described later. Thereby, entrance of water into the inside of the cell modules M is prevented, and at the same time, the cell modules M are electrically insulated. In FIG. 1, as an example, five fuel cells 20 are stacked and attached. The number of the fuel cells 20 is not limited to this, and also, layers of adhesive are not shown in FIG. 1.

Each fuel cell 20 has a cell frame 30 (see FIGS. 2A to 3B) and paired separators 40 and 41 provided on both sides of the cell frame 30, respectively. Gas flow channels F1 and F2 are defined on both sides of the cell frame 30 (see FIGS. 2 and 3), respectively, for two different kinds of power-generation gases to flow therethrough. The two different kinds of power-generation gases are a hydrogen-containing gas and an oxygen-containing gas, and the paired separators include the anode-side separator 40 and the cathode-side separator 41.

The cell frame 30 is an insulating member made of resin. In this embodiment, the cell frame 30 has a horizontal rectangular shape in a front view seen in the stacking direction Z of the fuel cells 20, and has a substrate 31 having a certain thickness. The flange portion 32 is formed around the entire periphery of the substrate 31, protruding to both the front side and the rear side. A membrane electrode assembly (MEA) 33 is placed in the center of the cell frame 30. Manifold portions ML and MR are located on both sides of (or adjacent to both end portions of) the membrane electrode assembly 33, respectively.

The membrane electrode assembly 33 includes a solid polymer electrolyte membrane and paired electrodes sandwiching the electrolyte membrane.

The manifold portions ML and MR allow the hydrogen-containing gas and the oxygen-containing gas as well as cooling fluid to flow in and out, respectively. Diffuser regions D through which the hydrogen-containing gas or the oxygen-containing gas flows are formed between the membrane electrode assembly 33 and the manifold portion ML and between the membrane electrode assembly 33 and the manifold portion MR, respectively. In this embodiment, the cooling fluid is, as an example, water.

The manifold portion ML includes manifold holes $M^1$ to M3 forming, continuously in the stacking direction Z, flow channels for supplying the oxygen-containing gas, the cooling fluid, and the hydrogen-containing gas, respectively.

The manifold portion MR includes manifold holes M4 to M6 forming, continuously in the stacking direction Z, flow channels for exhausting the hydrogen-containing gas, the cooling fluid, and the oxygen-containing gas, respectively. Note that some or all of the supplying flow channels and the exhausting flow channels may be reversed in position.

The diffuser regions D are formed between the cell frame 30 and each of the separators 40 and 41, i.e., on each side of the cell frame 30. Although not shown, multiple protrusions of truncated cone shape are formed in each diffuser region D at predetermined intervals.

FIG. 2(A) is plan views each showing one of the faces of the anode-side separator 40, the cathode-side separator 41, the membrane electrode assembly 33 and its cell frame 30, or the seal plate P1. FIG. 2(B) is plan views showing the other face of each member shown in FIG. 2(A), turned around about its short axis. The members shown in FIG. 2(A) are stacked sequentially such that the face of the seal plate P1 shown at the bottom appears on the top. Also, the members shown in FIG. 2(B) are stacked sequentially such that the face of the anode-separator 40 shown at the top appears on the top.

As shown in FIGS. 2A to 3A, an adhesive seal 80 is provided continuously on the entire outside edge portion of the cell frame 30 and around each of the manifold holes M1 to M6. On the cathode face of the cell frame 30 shown in FIG. 2(A), the adhesive seal 80 surrounds only the manifold holes M2 to M5 so that the manifold holes M1 and M6 for supplying and exhausting the oxygen-containing gas, respectively, are open to allow the oxygen-containing gas to flow therefrom.

On the anode face of the cell frame 30 shown in FIG. 2(B), the adhesive seal 80 surrounds only the manifold holes M1; M2, M5, and M6 so that the manifold holes M3 and M4 for supplying and exhausting the hydrogen-containing gas, respectively, are open to allow the hydrogen-containing gas to flow therefrom.

As shown in FIGS. 2A, 2B, and 3B, the separators 40 and 41 are each formed by press-molding a metal plate, such as a stainless steel plate, into a rectangular shape that can be placed inside of the flange portion 32 of the cell frame 30.

As shown in FIG. 3(B), the separators 40 and 41 (especially the cathode-side separators 41) each have recessed portions 40a or 41a and projecting portions 40b or 41b in its center portion facing the membrane electrode assembly 33, the portions being continuous in the longitudinal direction. Manifold holes M1 to M6 are formed in end portions of each separator 40 or 41 to correspond to the manifold holes M1 to M6 of the cell frame 30 in FIG. 3(A), respectively.

As in the cell frame 30, the adhesive seal 80 is provided continuously on the entire outside edge portion of each separator 40 or 41 and around each of its manifold holes M1 to M6. In order to allow an appropriate one of the oxygen-containing gas, the hydrogen-containing gas, and the cooling fluid to flow through a corresponding interlayer space, the adhesive seal 80 is not formed around corresponding ones of the manifold holes M1 to M6 which should be open to allow the appropriate gas or fluid to flow through the interlayer space, and surrounds rest of the manifold holes M1 to M6, as shown in FIGS. 2A and 2B.

Flow channels for the cooling fluid F3 (called "cooling flow channels F3" below) are defined between the opposing separators 40 and 41 of the adjacent fuel cells 20. The cooling flow channels F3 are also formed in a space between two adjacent cell modules M, or more specifically, in a space where their outermost fuel cells 20 face and abut each other, the space being surrounded by the flange portions 32. The seal plate P1 according to the first embodiment of the present invention is interposed in this cooling flow channels F3 between the cell modules M.

The seal plate P1 according to the first embodiment of the present invention is formed separately from the fuel cells 20. As shown in FIGS. 2A, 2B, and 4, the seal plate P1 includes a plate substrate 50, manifold portions ML and MR opened in respective end portions of the plate substrate 50, and a pressure-drop adjustment portion B1 according to a first example in the center portion of the plate substrate 50.

The plate substrate 50 is formed by molding a single conductive metal plate into a shape and size similar to that of the fuel cell 20 in a plan view seen in the stacking direction. By faulting the plate substrate 50 with a conductive metal plate, stable electrical conductivity can be obtained for a long period of time. The manifold portions ML and MR formed in the plate substrate 50 are equivalent of those formed in the cell frame 30 and the like.

The seal plate P1 has manifold holes M1 to M6 corresponding to the manifold holes M1 to M6 of the cell modules M. When interposed between the cell modules M, the seal plate P1 allows the manifold holes M1 to M6 of one of the cell modules M to be continuous with those of the other cell module M so that continuous flow channels can be formed.

The seal plate P1 includes seal members 51 to 54 (first seal members). The seal members 51 to 54 are formed on peripheral portions of the manifold holes M1, M3, M4, and M6, respectively, to define manifold holes M1, M3, M4, and M6 from which the oxygen-containing gas or the hydrogen-containing gas flows. The seal members 51 to 54 are formed independently from one another. As a matter of course, the manifold holes M2 and M4 from which the cooling fluid flows have no seal member formed therearound and thus open.

As shown also in FIG. 5, the seal plate P1 has an outer periphery seal member 55 (a second seal member) along the outermost periphery portion of the plate substrate 50. The seal plate P1 includes a third seal member provided between the second seal member (55) and the first seal members (51 to 54). In this embodiment, the third sealing member is an inner periphery seal member 56 formed inside of and in parallel with the outer periphery seal member 55 with a certain distance therebetween. In a more preferable embodiment, these sealing members 51 to 56 may be formed with an electrically-insulating material. In FIG. 5, reference numeral 9 denotes an adhesive.

Being independent in terms of structure, the seal members 51 to 54 can have different designs (heights, widths, and shapes) from one another. Since different fluids flow through different sealed portions, the seal members deteriorate differently from one another depending on where they seal. The seal members 51 to 54 can be designed individually according to their deterioration environment. Thus, the reliability of the fuel cell stack A can be improved.

In the fuel cell stack A, as shown in FIG. 5, the adhesive 9 joining the fuel cells 20 together coincides in position with the inner periphery seal member 56 (the third seal member) when seen in the stacking direction of the cell modules M. In the example shown in FIG. 5, the adhesive 9 joining the cell frame 30 to each of the separators 40 and 41 also coincides with the inner periphery seal member 56 (the third seal member) when seen in the stacking direction of the cell modules M. Furthermore, as shown in FIG. 5, the first seal members 51 to 54 and an adhesive 9 directly attaching at least two of the separators 40 and 41 of adjacent fuel cells 20 together are arranged to coincide with each other when viewed in the stacking direction of the cell modules M.

As shown in FIG. 4, the pressure-drop adjustment portion B1 has a function of reducing or adjusting the pressure drop of the cooling fluid flowing through the cooling flow channels F3. Specifically, in the pressure-drop adjustment portion B1, the pressure drop is reduced or adjusted by reducing the cross section of the cooling flow channel in an active area, near the active area, or in and near the active area.

The reduction in the cross section of the cooling flow channel F3 includes both reduction in an X direction of the cooling fluid flow and reduction in a Y direction perpendicular to the X direction. The "active area" is a region facing the membrane electrode assembly 33 described above. To be more specific, the "active area" is an area which coincides with the area having the membrane electrode assembly 33 when seen in the stacking direction (Z direction).

The pressure-drop adjustment portion B1 is formed in the active area. The pressure-drop adjustment portion B1 includes: an upstream array 60 of slits and a downstream array 61 of slits being formed in parallel with a long-axis center line O1 of the plate substrate 50; and two slits 62 in parallel with a short-axis center line O2 perpendicular to the long-axis center line O1. The long-axis center line O1 is an imaginary line dividing the short sides of the plate substrate 50 in half, and the short-axis center line O2 is an imaginary line dividing the long sides of the plate substrate 50 in half.

The upstream array 60 consists of eight slits 60a arranged upstream of the flow direction of the cooling fluid (the X direction), and the slits 60a extend in parallel with the X direction and have the same length and width. The downstream array 61 consists of eight slits 61a arranged downstream of the flow direction of the cooling fluid (the X direction). The slits 61*a*, like the slits 60*a*, extend in parallel with the X direction and have the same length and width.

The seal plate P1 can reduce or adjust the pressure drop in the cooling flow channels F3 between the adjacent cell modules M. Moreover, if, for example, the fuel cell stack has the cooling flow channels between the adjacent fuel cells 20 as well, the seal plate P1 can reduce variations in the flow rate of the cooling fluid among all the cooling flow channels.

In this way, in sum, the fuel cell stack A includes the fuel cells 20 each formed by sandwiching the membrane electrode assembly 33 having the cell frame (insulating member) 30 therearound, between the paired separators 40 and 41. The cell module M is formed by stacking the multiple fuel cells 20 one on top of another and attaching together the insulating members of the adjacent fuel cells 20. The fuel cell stack A is formed by stacking multiple cell modules M.

The fuel cell stack A includes the seal plates P1 interposed between the cell modules M. Each seal plate P1 has the manifold holes M1, M3, M4, and M6 so that the two kinds of power-generation gases can flow in and out the fuel cells 20 separately from each other. The seal plate P1 includes the first seal members 51 to 54 formed on the peripheral portions of the manifold holes M1, M3, M4, and M6, respectively, to providing sealing for the power-generation gas flowing therethrough.

Thus, the seal plate P1 including the seal members 51 to 54 can be easily removed from the cell module M. Accordingly, when the seal members 51 to 54 are deteriorated, only the seal plate P1 has to be replaced, which allows continued use of the fuel cells 20 and the cell modules M.

The seal plate P1 includes the outer periphery seal member 55 (the second seal member) formed along its outer periphery portion to seal the spaces between the seal plate P1 and its adjacent fuel cells 20. This can reliably block entrance of rainwater and the like from outside.

The seal plate P1 includes the inner periphery seal member 56 (the third seal member) between the outer periphery seal member 55 (the second seal member) and the first seal members 51 to 54. This can not only block entrance of rainwater and the like from outside, but also reliably prevent leak of the cooling fluid flowing through the cooling flow channels F3.

The first to third seal members 51 to 56 are formed of members having an electric insulation property. Thereby, in addition to the above-described effects of waterproofing and leak prevention, electric insulation is achieved between the fuel cell 20 and the seal plate P1 in a region other than the power-generation area (the active area) to enhance electrical conductivity in the power-generation area.

In the fuel cell stack A, the adhesive 9 joining the fuel cells 20 together coincides in position with the inner periphery seal member 56 (the third seal member) when seen in the stacking direction of the cell modules M. By their elastic action, the adhesive 9 and the inner periphery seal member 56 can absorb the displacement in the fuel cell stack A caused in the staking direction by, for example, swelling of the membrane electrode assembly 33. Accordingly, the surface pressure acting on each fuel cell 20 can be evened out. Moreover, as shown in FIG. 5, the adhesive 9 joining the cell frame 30 to each of the separators 40 and 41 coincides with the inner periphery seal member 56 when seen in the stacking direction. Thus, the displacement absorbing function described above can be enhanced even more.

With reference to FIGS. 6A to 9B, another example of the fuel cell stack A described above is described in detail below.

FIG. 6(A) is an enlarged sectional view of a part around the seal member 51 shown in FIG. 5, and FIG. 6(B) is an enlarged sectional view of a part indicated by encircling line I in FIG. 6(A). FIG. 6(A) shows the seal member 51 formed continuously on the peripheral portion of the manifold hole M1 for supplying the oxygen-containing gas. The seal member 51 includes a seal base 51*a* having a horizontal rectangular shape in section, and a seal lip 51*b* protruding from the upper surface of the seal base 51*a* and having a triangular shape in section.

The seal member 51 provides sealing and is made of a known rubber material which is elastically deformable. The seal base 51*a* has a step at its lower surface, and the seal member 51 covers one main surface (which is the upper surface in FIG. 6(B)) 50*a* of the plate substrate 50 near the manifold hole M1 as well as a sidewall surface 50*b* of the plate substrate 50. The seal lip 51*b* is located closer to the center of the manifold hole M1 (i.e., the right in FIGS. 6A and 6B) than the sidewall surface 50*b* of the plate substrate 50 is. In other words, the seal lip 51*b* is formed at a position displaced to a side of the plate substrate 50 where the manifold hole M1 is formed.

The tip of the seal lip 51*b* is in contact with the cathode-side separator 41 of the fuel cell 20 adjacently above. Even when the anode-side separator 40 and the plate substrate 50, among the separators 40 and 41 and the plate substrate 50, are in direct contact with each other with no space therebetween as in the portion indicated by encircling line II in FIG. 6(A), the seal member 51 can have enough thickness at the portion attached to the plate substrate 50 as indicated by reference numeral 52*a* in FIG. 6(B). The seal member 51 can seal not only the space between the cathode-side separator 41 and the plate substrate 50, but also the space between the anode-side separator 40 and the plate substrate 50. Accordingly, a single seal member 51 can seal spaces between the three members, the separators 40, 41 and the plate substrate 50, which can contribute to structural simplification and size reduction of the members.

If the seal member 51 is provided continuously over both surfaces of the plate substrate 50, a crack or tear is easily caused due to such factors as displacement of the separator 40 or 41 or the plate substrate 50. In this embodiment, the seal member 51 covers a portion of the plate substrate 50, from the main surface 50*a* to the sidewall surface 50*b*. In other words, the seal member 51 is provided only on one side of the plate substrate 50. This allows prevention of a crack or tear even when the separator 40 or 41 or the plate substrate 50 is displaced. Although the seal member 51 is described as an example in this embodiment, the same applies to the other seal members 52 to 54, as well.

FIG. 7(A) is a partially-enlarged sectional view, taken along line D-D in FIG. 4, of the fuel cell stack A. FIG. 7(B) is an enlarged sectional view of a part indicated by encircling line III in FIG. 7(A). Specifically, FIGS. 7A and 7B each show the peripheral portion of the plate substrate 50 that defines the manifold hole M3 for supplying the hydrogen-containing gas, and also show the seal member 52 formed along that peripheral portion.

The seal member 52 has a seal base 52*a* shaped as a horizontal rectangle in section and a seal lip 52*b* protruding from the lower surface of the seal base 52*a* and shaped as a triangular in section. Similar to the seal member 51, the seal member 52 provides sealing, and is made of, for example, a known rubber material which is elastically deformable.

The seal base 52*a* has a step at its upper surface, and covers one main surface (which is the lower surface in FIG. 7(B)) 50*c* and a sidewall surface 50*b* of the plate substrate 50 defining the manifold hole M3. The seal lip 52b is located closer to the center of the manifold hole M3 (i.e., the left in FIGS. 7A and 7B) than the sidewall surface 50b of the plate substrate 50 is. In other words, the seal lip 52b is formed at a position displaced to a side of the plate substrate 50 where the manifold hole M3 is formed, away from the main surface of the plate substrate 50.

The tip of the seal lip 52b is in contact with the anode-side separator 40 of the fuel cell 20 adjacently below. Among the separators 40 and 41 and the plate substrate 50, the cathode-side separator 41 and the plate substrate 50 are in direct contact with each other with no space therebetween as in the portion indicated by encircling line III in FIG. 7(A). The seal member 52 can seal not only the space between the anode-side separator 40 and the plate substrate 50, but also the space between the cathode-side separator 41 and the plate substrate 50.

Accordingly, a single seal member 52 can seal spaces between the three members, the separators 40, 41 and the plate substrate 50, which can contribute to structural simplification and size reduction of the members. Moreover, like the seal member 51 shown in FIGS. 6A and 6B, the seal member 52 allows prevention of a crack or tear even when the separator 40 or 41 or the plate substrate 50 is displaced.

The seal member 51 shown in FIGS. 6A and 6B and the seal member 52 shown in FIGS. 7A and 7B are arranged on the upper surface and the lower surface, respectively, of the plate substrate 50 in relative positions to each other. Specifically, the seal lips 51b and 52b are formed on the front surface and the rear surface of the plate substrate 50, respectively, at positions symmetric to each other with respect to the center axis (the long-axis center line O1) of the plate substrate 50. To be more specific, the pointing-up seal lip 51b of the seal member 51 formed around the manifold hole M1 and the pointing-down seal lip 52b of the seal member 52 formed around the manifold hole M3 are arranged in relative positions to each other on the upper surface and on the lower surface, respectively, of the plate substrate 50 with respect to the long-axis center line O1 in parallel with the flow direction of the cooling medium (the X direction) shown in FIG. 4. This allows stable sealing.

When a single seal member is to seal three plates (two spaces), each manifold hole portion has a different combination of two members in direct contact with each other. This problem in the combinational difference can be solved by arranging the seal members 51 and 52 in relative positions to each other on the upper surface and on the lower surface, respectively, as described above. Thus, stable sealing can be achieved on both surfaces of the plate substrate 50. Further, since the gas flow channels and the seal members can have the same height, the seal members can be reduced in size. Moreover, the seal members can have enough height (thickness), which improves the reliability of the sealing performance.

FIG. 8(A) is a sectional view taken along line E-E in FIG. 4, and FIG. 8(B) is an enlarged sectional view of a part indicated by encircling line IV in FIG. 8(A). FIG. 8(A) is an enlarged sectional view of an area around a seal member, according to another example, formed continuously along the peripheral portion of the manifold hole M4. Note that portions equivalent to those in the above embodiment are given the same reference numerals as those given to them, and are not described in detail again.

A peripheral portion 50d of the plate substrate 50 which defines the manifold hole M4 is bent upward from the surface of the plate substrate 50. Then, the seal member 53 is formed along the entire peripheral portion 50d endlessly (annularly).

The seal member 53 is made of a known, elastically deformable material, such as rubber. The seal member 53 has a seal base 53a shaped as a horizontal rectangle in section and a seal lip 53b protruding from the upper surface of the seal base 53a and shaped as a triangle in section. Like the seal members 51 and 52, the seal member 53 provides sealing.

An outer half portion of the seal base 53a is shaped to cover two main surfaces (upper and lower surfaces in FIGS. 8A and 8B) 50a and 50c and a sidewall surface 50b of the plate substrate 50 defining the manifold hole M4, and the seal member 53 is fixed to the plate substrate 50 in such a manner that the seal lip 53b is located closer to the center of the manifold hole M4 (to the right in FIGS. 8A and 8B) than the sidewall surface 50b of the plate substrate 50 is. In other words, the seal lip 53b is shifted to a side of the plate substrate 50 where the manifold hole M4 is formed.

Like the seal members 51 and 52, the seal member 53 can seal spaces between the three members: the separators 40 and 41 and the plate substrate 50. In addition to this, the insulation property can be enhanced because the inner peripheral surface of the manifold hole M4 is covered entirely.

FIG. 9(A) is an enlarged sectional view, taken along line C-C in FIG. 4, of an area around an inner periphery seal member according to another example. FIG. 9(B) is an enlarged sectional view of a part indicated by encircling line V in FIG. 9(A). Note that portions equivalent to those in the above embodiments are given the same reference numerals as those given to them, and are not described in detail again.

An inner periphery seal member 56A is arranged on each surface of the plate substrate 50. The plate substrate 50 is provided, in its upper and lower surfaces, with recessed portions 50e for seal member, whose depths are determined considering the heights of the inner periphery seal members 56A. The inner periphery seal members 56A are made of a known, elastically-deformable material, such as rubber. Each inner periphery seal member 56A includes a seal base 56a shaped as a horizontal rectangle in section and a seal lip 56b protruding from the surface of the seal base 56a and shaped as a triangle in section.

Because the plate substrate 50 has the recessed portions 50e for seal member, the plate substrate 50 is partially reduced in thickness, allowing the inner periphery seal members 56A to be increased in thickness. Consequently, a seal member with high allowable compression (high shrinkage) can be adopted. Further, the compressibility of rubber forming the seal member can be reduced to improve the robustness of the seal member and to extend the life of the seal member.

The seal plate P1 including the seal members 51 to 56 is applied to the fuel cell stack A described above. Since the seal plate P1 can be easily removed from the cell modules M, only the seal plate P1 has to be replaced upon deterioration of the seal members 51 to 56. Accordingly, such a seal plate P1 can contribute to continued use of the fuel cells 20 and the cell module M.

Further, in the fuel cell stack shown in FIG. 9(A), the second seal member (55) is thicker than any of the first seal members 51 (52 to 54), the thickness being measured in the cell stacking direction. More specifically, the second seal member, which is the outer periphery seal member 55 provided on the outer periphery portion of the seal plate P1, seals the space between the adjacent cell frames 30, and therefore needs to be thicker (higher) than the first seal members 51 (52 to 54) formed along the peripheral portion of the manifold hole. For this reason, when the first seal members 51 to 54 and the second seal member 55 have the above relation in their thicknesses measured in the cell stacking direction, robustness in terms of insulation can be improved.

FIGS. 10 to 14 are plan views showing seal plates according to second to fifth embodiments of the present invention. Note that portions equivalent to those in the above embodiment are given the same reference numerals as those given to them, and are not described in detail again.

Second Embodiment

As shown in FIG. 10, a seal plate P2 according to the second embodiment includes a pressure-drop adjustment portion B2 according to a second example. The pressure-drop adjustment portion B2 has: an upstream array 60A of slits and a downstream array 61A of slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60A consists of ten slits 60b arranged upstream of the flow direction of the cooling fluid (the X direction). In this embodiment, five slits 60b are arranged on each side of the long-axis center line O1 with a predetermined distance W1 therebetween. Each slit 60b is narrower than the slit 60a described above. The slits 60b have the same length and width and arranged in parallel with each other.

The downstream array 61A consists of ten slits 61b arranged downstream of the flow direction of the cooling fluid (the X direction). Slits 61b have the same shape, size, and arrangement pattern as the slits 60b. In this embodiment, five slits 61b are arranged on each side of the long-axis center line O1 with the predetermined distance W1 therebetween.

The seal plate P2 is capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P2 can reduce variations in the flow rate of the cooling fluid among all the cooling flow channels.

Third Embodiment

As shown in FIG. 11, a seal plate P3 according to the third embodiment has a pressure-drop adjustment portion B3 according to a third example. The pressure-drop adjustment portion B3 has: an upstream array 60B of slits and a downstream array 61B of slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60B consists of fifteen slits 60c arranged upstream of the flow direction of the cooling fluid (the X direction). The slits 60c are arranged in parallel with each other at equal intervals in their short-side direction. The downstream array 61B consists of eight slits 61c arranged downstream of the flow direction of the cooling fluid (the X direction). The slits 61c have the same shape and size as the slits 60c, and are arranged at intervals twice those of the slits 60c.

Similar to the prior embodiments, the seal plate P3 is capable of reducing or adjusting the pressure drop in the cooling flow channels F3 between the adjacent cell modules M. In addition to this, the seal plate P3 can adjust the pressure drop in the cooling flow channels F3 between their upstream and downstream. Moreover, if, for example, the fuel cell stack has the cooling flow channels between the adjacent fuel cells 20 as well, the seal plate P3 can reduce variations in the flow rate of the cooling fluid among all the cooling flow channels.

Fourth Embodiment

As shown in FIG. 12, a seal plate P4 according to the fourth embodiment has a pressure-drop adjustment portion B4 according to a fourth example. The pressure-drop adjustment portion B4 has: an upstream array 60C of slits and a downstream array 61C of slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60C consists of eight slits 60d arranged upstream of the flow direction of the cooling fluid (the X direction). The slits 60d are arranged in parallel with each other at equal intervals in their short-side direction. The slits 60d have the same shape and size as the slits 60a in FIG. 4. The downstream array 61C consists of seven slits 61d arranged downstream of the flow direction of the cooling fluid (the X direction). The slits 61d are arranged in parallel with each other at equal intervals in their short-side direction. The slits 61d have the same shape and size as the slits 60d, and are each located between the adjacent slits 60d when seen in the X direction.

Similar to the prior embodiments, the seal plate P4 is capable of reducing or adjusting the pressure drop in the cooling flow channels F3 between the adjacent cell modules M. In addition to this, the seal plate P4 can adjust the pressure drop in the cooling flow channels F3 between their upstream and downstream. Moreover, if, for example, the fuel cell stack has the cooling flow channels between the adjacent fuel cells 20 as well, the seal plate P4 can reduce variations in the flow rate of the cooling fluid among all the cooling flow channels.

Fifth Embodiment

As shown in FIG. 13, a seal plate P5 according to the fifth embodiment has a pressure-drop adjustment portion B5 according to a fifth example. The pressure-drop adjustment portion B5 has: an upstream array 60D of slits and a downstream array 61D of slits being formed in parallel with the long-axis center line O1 of the plate substrate 50; and two slits 62 extending in parallel with the short-axis center line O2 of the plate substrate 50, which is perpendicular to the long-axis center line O1.

The upstream array 60D consists of eight slits 60e to 60h and 60e to 60h arranged upstream of the flow direction of the cooling fluid (the X direction). The slits 60e to 60h and 60e to 60h are arranged in parallel with each other at equal intervals in their short-side direction. The slits 60e to 60h are arranged such that the length of the slit becomes shorter as the slit is closer to the long-axis center line O1 in the short-side direction. The downstream array 61D consists of eight slits 60e to 60h and 60e to 60h arranged downstream of the flow direction of the cooling fluid (the X direction).

The downstream slits 60e to 60h and 60e to 60h have the same configuration as the upstream slits 60e to 60h and 60e to 60h.

Similar to the prior embodiments, the seal plate P5 is also capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P5 can reduce variations in the flow rate of the cooling fluid among all the cooling flow channels.

FIG. 14 is an enlarged sectional view, taken along line V-V in FIG. 4, showing the positional relation between the seal plate P1 and the separators 40 and 41. FIG. 15 shows the same view, except for having a plate substrate 50' which is thicker than the plate substrate 50 in FIG. 14. Note that portions equivalent to those in the above embodiments are given the same reference numerals as those given to them, and are not described in detail again.

The seal plate P1 is joined to the separators 40 and 41 with the following positional relation. Specifically, each slit 60a of the plate substrate 50 faces not the projecting portions 40b and 41b, but the recessed portions 40a and 41a of the separators 40 and 41. When the slit 60a is narrower than an opening size W2 of the recessed portions 40a and 41a, the recessed portions 40a and 41a are shifted in the in-plane direction (perpendicular to the stacking direction). Thus, the position of the slit 60a in the recessed portions 40a and 41a can be adjusted to adjust how much the plate substrate 50 protrudes to the inside of the recessed portions 40a and 41a (namely, protruding lengths W3 and W4).

By thus adjusting the protruding lengths W3 and W4 of the plate substrate 50 inside the recessed portions 40a and 41a, the pressure drop in the cooling flow channels F3 can be reduced or adjusted. Further, when the seal plate P1 and the separators 40 and 41 have the positional relation described above, the pressure drop can be adjusted by increasing the thickness of the plate substrate, like the plate substrate 50' shown in FIG. 15.

The thickness of the seal plate P1 (the plate substrate 50') measured in the stacking direction of the cell modules M (the Z direction) is larger than the thickness of the separators 40 and 41. The seal plate P1 seals cooling water with the second seal member (the outer periphery seal member 55) provided along the outer periphery of the seal plate P1. To achieve insulation from outside, the outer periphery seal member 55 and the plate substrate 50 or 50' should preferably be fixed firmly. To fix the elastic outer periphery seal member 55 to the plate substrate 50 or 51', the plate substrate 50' needs to be thicker than each of the separators 40 and 41. This is because the separators 40 and 41 are too thin to secure the outer periphery sealing member 55. For this reason, the thickness of the plate substrate 50' measured in the stacking direction (the Z direction) is made larger than each of the separators 40 and 41. This allows the outer periphery seal member 55 to be fixed firmly to the plate substrate 50 or 50'. Preferably, the plate substrate 50' should have a minimum thickness which still allows enough power for fixing the outer periphery seal member 55, in order to avoid unnecessary increase in the thickness of the fuel cell stack A measured in the staking direction (the Z direction).

FIGS. 16 and 17 are enlarged sectional views of a part of the section taken along line V-V in FIG. 4. As shown in FIGS. 16 and 17, the seal plate P1 is inserted between the separators 40 and 41. In FIG. 16, the pitches of the recessed portions 40a and 41a and the projecting portions 40b and 41b of the separators 40 and 41 are each half that of the slits 60a formed in the plate substrate 50. The width of each slit 60a is almost the same as the opening size W2 of the recessed portions 40a and 41a.

In FIG. 17, the pitches of the recessed portions 40a and 41a and the projecting portions 40b and 41b of the separators 40 and 41 are the same as that of the slits 60a formed in the plate substrate 50. The width of each slit 60a is the same as the opening size W2 of the recessed portions 40a and 41a.

As shown in FIGS. 16 and 17, portions of the plate substrate 50 at which no slit 60a is formed are sandwiched by the projecting portions 40b and 41b of the paired separators 40a and 41. Thus, without interfering with the conductive property, partial decrease in the surface pressure can be prevented, and deformation is not caused in the separators 40 and 41 and the like.

FIGS. 18 and 19 are plan views showing seal plates P6 and P7 according to sixth and seventh embodiments of the present invention, respectively. Note that portions equivalent to those in the above embodiments are given the same reference numerals as those given to them, and are not described in detail again.

Sixth Embodiment

The seal plate P6 according to the sixth embodiment of the present invention has pressure-drop adjustment portions B6 according to a sixth example. The pressure-drop adjustment portions B6 each have a function of reducing or adjusting the pressure drop of the cooling water flowing through the cooling flowing channels F3. More specifically, the pressure-drop adjustment portions B6 reduce or adjust the pressure drop by reducing the cross section of each cooling flow channel F3 near the active area of the seal plate P6.

The pressure-drop adjustment portions B6 are arranged in the respective diffuser regions D1. The pressure-drop adjustment portions B6 are each formed as an opening whose area, viewed in the stacking direction Z, increases away from the long-axis center line O1 toward the ends of the seal plate P6 in its short-side direction (the opening being called an opening B6 below). The opening B6 is defined by a long side 70a in parallel with the short-axis center line O2, short sides 70b in parallel with the long-axis center line O1, and a long side 70c which describes a curved line protruding toward the inside of the opening and extending from the inner ends of the respective short sides 70b toward the long-axis center line O1.

Similar to the prior embodiments, the seal plate P6 is capable of reducing or adjusting the pressure drop in the cooling flow channels F3 between the adjacent cell modules M. In particular, the length of the opening measured in the flow direction of the cooling fluid (the X direction) can be small at the center and large at the end portions of the plate substrate 50 in its short-side direction. Thus, the pressure drop between the channels can be adjusted. Moreover, if, for example, the fuel cell stack has the cooling flow channels between the adjacent fuel cells 20 as well, the seal plate P6 can reduce variations in the flow rate of the cooling fluid among all the cooling flow channels.

Seventh Embodiment

The seal plate P7 according to the seventh embodiment of the present invention has pressure-drop adjustment portions B7 according to a seventh example. The pressure-drop adjustment portions B7 are arranged near the active area, or in this embodiment, in the respective diffuser regions D1.

The pressure-drop adjustment portions B7 are each formed as an opening whose area, viewed in the stacking direction Z, increases away from the long-axis center line O1 toward the ends of the seal plate P7 in its short-side direction (the opening being called an opening B7 below). The opening B7 is defined by a long side 70a in parallel with the short-axis center line O2, short sides 70b in parallel with the long-axis center line O1, and a long side 70c. The opening B7 is subdivided by a connected piece 70d. The long side 70c describes a curved line protruding toward the inside of the opening and extending from the inner ends of the respective short sides 70b toward the long-axis center line O1.

Similar to the prior embodiments, the seal plate P7 is capable of reducing or adjusting the pressure drop in the cooling flow channels F3 between the adjacent cell modules M. In particular, the length of the opening measured in the flow direction of the cooling fluid (the X direction) can be small at the center and large at end portions of the plate substrate 50 in its short-side direction. Thus, the pressure drop between the channels can be adjusted. Moreover, for example, in the fuel cell stack having the cooling flow channels also between the adjacent fuel cells 20, the seal plate P7 can suppress variations in the flow rate of the cooling fluid among all the cooling flow channels.

Eighth Embodiment

FIG. 20 is a plan view showing a seal plate P8 according to an eighth embodiment of the present invention. FIG. 21 is an enlarged plan view of an end portion of the seal plate P8 on which the adhesive seal 80 of the separator is interposed. Note that portions equivalent to those in the above embodiments are given the same reference numerals as those given to them, and are not described in detail again.

The seal plate P8 according to the eighth embodiment of the present invention has pressure-drop adjustment portions B8. The pressure-drop adjustment portions B8 have a function of reducing or adjusting the pressure drop of the cooling water flowing through the cooling flow channels F3. Specifically, the pressure-drop adjustment portions B8 reduce or adjust the pressure drop by reducing the cross section of the cooling flow channels F3 in the active area, near the active area, or in and near the active area. The reduction in the cross section of the cooling flow channels includes both reduction in the flow direction of the cooling fluid (the X direction) and reduction in the Y direction perpendicular to the X direction.

The pressure-drop adjustment portions B8 are arranged in the respective diffuser regions D1 near the active area. As shown in FIG. 21, each pressure-drop adjustment portion B8 has an opening portion 71 for reduction or adjustment of the pressure drop of the cooling water flowing through the cooling flow channels F3 formed between the cell modules M. The opening portion 71 has a long connected piece 71c and a short connected piece 71d for reinforcement, bridging thereover in the Y direction which intersects the flowing direction X of the cooling fluid.

To be more specific, the opening portion 71 has a portion projecting in the opposite direction to the X direction. The opening portion 71 includes a large opening portion 71a shaped as a long rectangle extending in parallel with the short-axis center line O2 and a small opening portion 71b located on the long-axis center line O1. The opening portion 71 also has the long connected piece 71c bridging over the large opening portion 71a between its short sides, at a position somewhat shifted toward the short-axis center line O2. The long connected piece 71c subdivides the large opening portion 71a to form a slit 62 extending along the short-axis center line O2. The opening portion 71 also includes the short connected piece 71d bridging over the intermediate portion of the small opening portion 71b.

The short connected piece 71d is located at a position facing a seal portion 80a of the adhesive seal 80 provided on the cell frame 30. The seal portion 80a can be pressed by the short connected piece 71d. The long connected piece 71c is located at a position facing the diffuser region D of the cell frame 30. Thus, the long and short connected pieces 71c and 71d function to suppress deformation of the diffuser region D of the cell frame 30.

The seal member (80) is provided on each of the separators constituting the fuel cell 20 (only the adhesive seal is shown in FIG. 21). In the seal plate P8, the slits 62 are formed in portions where no seal member (80) is provided.

Thus, similar to the prior embodiments, the seal plate P8 is capable of reducing or adjusting the pressure drop in the cooling flow channels F3 between the adjacent cell modules M. Moreover, if, for example, the fuel cell stack has the cooling flow channels between the adjacent fuel cells 20 as well, the seal plate P8 can reduce variations in the flow rate of the cooling fluid among all the cooling flow channels.

As shown in FIG. 21, the short connected piece 71d is formed at such a position as to face the seal portion 80a extending in the short-axis direction. The slit 62 is formed in an area where no seal member (80) is to be provided. Consider a case where the gas pressure becomes greater than the cooling water pressure, so that the differential pressure between them acts on the seal member 80. In this case, the differential pressure does not act as a force in the peeling direction of the seal member 80 if the seal member 80 is an adhesive seal or as a force in a direction of decreasing the shrinkage (allowable compression) of the seal member 80 if the seal member 80 is a compression seal. Thereby, the reliability and durability of the seal member 80 can be improved.

The seal plate P8 has the opening portions 71 for reducing or adjusting the pressure drop of the cooling water flowing through the cooling flow channels F3 formed between the cell modules M. Each opening portion 71 has the long and short reinforcement connected pieces 71c and 71d bridging thereover in the Y direction intersecting the flow direction of the cooling fluid (the X direction). Thus, the seal plate P8 can achieve its pressure-drop adjustment function with the opening portions 71, and at the same time, can suppress deformation of the cell frame 30 at its diffuser regions D.

More specifically, the pressure drop of the fuel cell stack A can be adjusted as described above by the opening portions 71 provided in each seal plate P8. Depending on the operation mode, such as at the time of activation, the fuel cell stack A is operated with the power-generation gases intentionally increased or decreased. In this event, the seal plate P8 and the cell frame 30 sometimes deform in their thickness direction, and also, the flow rates of the power-generation gases and/or the cooling fluid might become unsteady to cause pulsation. To deal with this, the reinforcement connected pieces 71c and 71d are provided to each opening portion 71 of the seal plate P8 to, irrespective of the operation mode, prevent deformation of the seal plate P8 and the cell frame 30 and stabilize the capacities of the cooling flow channels F3. Thus, the flow rate of the cooling fluid becomes steady, and favorable cooling function and power-generation function can be maintained.

Ninth Embodiment

FIG. 22(A) is a plan view showing a seal plate P9 according to a ninth embodiment of the present invention, and FIG. 22(B) is an enlarged sectional view of a part of a section taken along line VII-VII in FIG. 22(A). Note that portions equivalent to those in the above embodiments are given the same reference numerals as those given to them, and are not described in detail again.

The seal plate P9 according to the ninth embodiment of the present invention shown in FIGS. 22A and 22B has a pressure-drop adjustment portion B9 according to a ninth example. The pressure-drop adjustment portion B9 has: an upstream array 60E of grooves and a downstream array 61E of grooves being formed in parallel with the long-axis center line O1 of the plate substrate 50; and two slits 62 extending in parallel with the short-axis center line O2 perpendicular to the long-axis center line O1.

The upstream groove group 60E consists of eight grooves 60i arranged upstream of the flow direction of the cooling fluid (the X direction). In this embodiment, four grooves 60i are arranged on each side of the long-axis center line O1 with a predetermined distance W1 therebetween. As shown in FIG. 22(B), the grooves 60i are formed by grinding, through etching or spinning, opposite portions in the plate substrate 50 on the upper and lower surfaces, respectively, to a predetermined thickness. The grooves 60i have almost the same width as the slits 60a. The grooves 60i have the same length and formed in parallel with each other at equal intervals.

The downstream array 61E consists of eight grooves 61j arranged downstream of the flow direction of the cooling fluid (the X direction). The grooves 60j have the same shape, size, and arrangement pattern as the grooves 60i.

Similar to the seal plates having the through-slits, the seal plate P9 is capable of reducing or adjusting the pressure drop in the cooling flow channels F3 between the adjacent cell modules M. The pressure drop can be reduced or adjusted also through adjustment of the depth of the grooves 60i and 60j. Moreover, it for example, the fuel cell stack has the cooling flow channels between the adjacent fuel cells 20 as well, the seal plate P9 can reduce variations in the flow rate of the cooling fluid among all the cooling flow channels.

When applied to the fuel cell stack A, any of the seal plates P1 to P9 can provide the following effects. Specifically, the seal plate can be easily removed from the cell module M. Accordingly, when the seal members 51 to 56 of a certain seal plate is deteriorated, only that seal plate has to be replaced, allowing continued use of the cell module M. Moreover, when a certain cell module M is broken, only that cell module M has to be replaced, which allows continued use of the seal plate.

Further, when the seal plate is interposed in a certain layer of the cooling flow channels F3 in the fuel cell stack A, the seal plate can make the pressure drop (the cooling water flow rate) be matched between those cooling flow channels F3 and the cooling flow channels F3 of another layer. Furthermore, variation in the cooling fluid flow rate between the fuel cell 20 at the end of the cell module M in the stacking direction and the fuel cell 20 in the center of the cell module M can be reduced. Note that the configuration of the pressure-drop adjustment portion can be any appropriate combination of the embodiments given above, which is determined according to the various conditions of the fuel cell stack and the seal plate.

Although the space defined between the adjacent cell modules M is the flow channel for the cooling medium in the embodiments above, the seal plate can be interposed also when that space is not used as the flow channel. In this case, the inner periphery seal member 56 formed on the plate substrate of the seal plate can be formed in such a manner as to, as shown in FIG. 23, surround the manifold holes M1 to M3 arranged near one of the short sides of the seal plate and surround the manifold holes M4 to M6 arranged near the other one of the short sides.

Tenth Embodiment

FIG. 24 is a sectional view of a fuel cell stack A according to a tenth embodiment of the present invention. FIG. 25(A) is a plan view of a cell module M shown in FIG. 24, and FIG. 25(B) is a perspective view of the fuel cell stack A. Note that only the seal members of a seal plate is superimposed on the cell module M in FIG. 25(A) in order to show the seal members. Note that the same constituents as those in the prior embodiments are given the same reference numerals as those given to them, and are not described in detail again.

In the fuel cell stack A, in order to allow voltage measurement of each fuel cell 20, one of the paired separators, the cathode-side separator 41 in the example in FIG. 24, has an extension 41E formed at part of the outer periphery portion of the separator 41 and a voltage measurement tab 41T protruding continuously from the extension 41E to the outside of the fuel cell stack A.

As shown in FIG. 24, an insulating adhesive seal portion 90 is provided between the extension 41E and the cell frame 30 of the fuel cell 20 and between the extension 41E and the cell frames 30 of the adjacent fuel cell 20. The adhesive seal portion 90 seals a space between the extension 41E and the cell frame 30 of the fuel cell 20 and a space between the extension 41E and the cell frames 30 of the adjacent fuel cell 20. This prevents a short circuit between the separators 41 and entrance of rainwater and the like from outside. In addition, the voltage measurement tabs 41T are provided at the same position as each other when viewed in the stacking direction of the fuel cells 20. In other words, the voltage measurement tabs 41T are arranged in such a manner as to form a straight line extending in the stacking direction as shown in FIG. 25(B), and a connector (not shown) is attached to the line of the voltage measurement tabs 41T.

A connector seal member 57 is provided on each side of the voltage measurement tab 41T in the long-axis direction. The connector seal member 57 is a film-like member continuously extending at least in the cell stacking direction of the cell modules M. The connector seal member 57 is in contact with the outer periphery seal member 55 of the seal plate P1, at its one end in the stacking direction (which is the lower end in FIG. 24 and the upper end in FIG. 25(B)) and extends therefrom continuously. The connector seal member 57 is a separate member from the outer periphery seal member 55.

When the cell modules M and the seal plates P1 are alternately stacked to form the fuel cell stack A, the connector seal member 57 of one cell module M comes into contact, at its other end in the cell stacking direction (the upper end in FIG. 24 and the lower end in FIG. 25(B)), with another connector seal member 57 of the adjacent cell module M. Thus, the connector members 57 of the respective cell modules M become continuous.

In the fuel cell stack A, similar to the prior embodiments, even when the seal members 51 to 57 are deteriorated, only the seal plate P1 has to be replaced to allow continued use of the cell module M. In addition to this, an improvement can be achieved for the waterproofing around the voltage measurement tabs 41T protruding outward of the fuel cell stack A.

Since the connector seal members 57 in the fuel cell stack A are film-like members extending continuously in the cell stacking direction, they can easily come into tight contact with the connector connected to the measurement tabs 41T, enabling improved waterproofing at their connection portions.

The connector seal members 57 in the fuel cell stack A are separate members from the outer periphery members 55 of the seal plates P1 and are continuous. This allows, not only the improvement in waterproofing described above, but also removal of only the seal plates P1 or even only the connector seal members 57.

Note that it is also possible to make the connector seal members 57 have an integral structure extending over multiple cell modules M or over the entire fuel cell stack A, or be integral with the outer periphery seal members 55, or be brought to an integral structure by being connected together after assembly of the fuel cell stack A.

Although the embodiments of the present invention have been described, the invention is not limited to the foregoing embodiments, and various modifications may be made within the scope of the invention.

For example, although the cell modules M have the same number of stacked fuel cells 20 as each other in the embodiments above, each cell module M may have a different number of stacked fuel cells 20.

Although the seal plates are formed of an electrically-conductive metal material in the above embodiments, at least their active areas may have to be formed of an electrically-conductive material. The seal plates are generally subjected to a surface treatment in order to obtain electrical conductivity which is stable over time. However, only the active areas may have to be subjected to the surface treatment. Thus, process efficiency can be achieved. In addition, carbon may be used as the material for the active areas, in which case the surface treatment is unnecessary.

Although the pressure-drop adjustment portions of the above embodiments have either slits or grooves, they may have both slits and grooves.

The entire contents of Japanese Patent Application No. P2012-053310 filed on Mar. 9, 2012 and Japanese Patent Application No. P2012-275479 filed on Dec. 18, 2012 are incorporated herein by reference.

INDUSTRIAL APPLICABILITY

According to the embodiments of the present invention, the seal plate including the seal members can be easily removed from the cell module. Thus, when the seal members are deteriorated, only the seal plate has to be replaced, which allows continued use of the cell module. Therefore, the present invention is industrially applicable.

REFERENCE SIGNS LIST

20 fuel cell
30 cell frame (insulating member)
33 membrane electrode assembly
40, 41 separator
50 plate substrate
51 to 54 seal member (first seal member)
51a, 52b seal lip
55 outer periphery seal member (second seal member)
56 inner periphery seal member (third seal member)
56b seal lip
71 opening
71c long connected piece (reinforcement connected piece)
71d short connected piece (reinforcement connected piece)
A fuel cell stack
M cell module
M1 to M6 manifold holes
P1 to P9 seal plate

The invention claimed is:

1. A fuel cell stack comprising:
  a plurality of cell modules, each of which comprises a plurality of fuel cells that are stacked, wherein each of the plurality of fuel cells comprises a membrane electrode assembly having an insulating member at an outer periphery portion thereof and paired separators sandwiching the membrane electrode assembly, and wherein the insulating members of adjacent fuel cells are attached together; and
  a seal plate interposed in a cooling flow channel formed between the separators of the adjacent cell modules,
  wherein the seal plate comprises:
    a plurality of manifold holes configured such that, from the manifold holes, two power-generation gases flow separately through the plurality of fuel cells, and
    a first seal member disposed on an entire periphery of one of the manifold holes to seal a corresponding one of the two power-generation gases flowing through the one of the manifold holes,
  wherein the first seal member and an adhesive directly attaching at least two of the separators of adjacent fuel cells together are arranged to coincide with each other when viewed in a stacking direction of the cell modules.

2. The fuel cell stack according to claim 1, wherein the seal plate comprises a second seal member provided on an entire outer periphery of the seal plate to seal a space between the seal plate and one or more fuel cells adjacent to the seal plate.

3. The fuel cell stack according to claim 2, wherein the second seal member comprises an electrical insulation property, the second seal member arranged on an outer side of the separators.

4. The fuel cell stack according to claim 2, wherein a thickness of the seal plate is larger than a thickness of each separator, the thicknesses being measured in a stacking direction of the cell modules.

5. The fuel cell stack according to claim 2, wherein the seal plate comprises cooling water manifold holes from which cooling water flows, wherein the cooling water manifold holes are not sealed.

6. The fuel cell stack according to claim 2, wherein the seal plate comprises a third seal member between the first seal member and the second seal member.

7. The fuel cell stack according to claim 6, wherein the first, second, and third seal members have an electrical insulation property.

8. The fuel cell stack according to claim 6, wherein the third seal member and an adhesive attaching at least two of the plurality of fuel cells together are arranged to coincide with each other when viewed in a stacking direction of the cell modules.

9. The fuel cell stack according to claim 2, wherein a thickness of the second seal member is larger than a thickness of the first seal member, the thicknesses being measured in a stacking direction of the cell modules.

* * * * *